US012544293B2

(12) United States Patent
Stinton et al.

(10) Patent No.: US 12,544,293 B2
(45) Date of Patent: Feb. 10, 2026

(54) DEVICE FOR ASSISTING WITH EXTENSION AND/OR FLEXION

(71) Applicant: Ermi LLC, Atlanta, GA (US)

(72) Inventors: Shaun Kevin Stinton, Sandy Springs, GA (US); Thomas P. Branch, Atlanta, GA (US); Edward S. Dittmar, Atlanta, GA (US); Matei Dan, Salt Lake City, UT (US); Tim Lester, Smyrna, GA (US)

(73) Assignee: Ermi LLC, Atlanta, GA (US)

( * ) Notice: Subject to any disclaimer, the term of this patent is extended or adjusted under 35 U.S.C. 154(b) by 935 days.

(21) Appl. No.: 17/628,080

(22) PCT Filed: Jul. 17, 2020

(86) PCT No.: PCT/US2020/042652
§ 371 (c)(1),
(2) Date: Jan. 18, 2022

(87) PCT Pub. No.: WO2021/011917
PCT Pub. Date: Jan. 21, 2021

(65) Prior Publication Data

US 2022/0331188 A1 Oct. 20, 2022

Related U.S. Application Data

(60) Provisional application No. 62/875,253, filed on Jul. 17, 2019.

(51) Int. Cl.
*A61H 1/02* (2006.01)

(52) U.S. Cl.
CPC ... *A61H 1/0274* (2013.01); *A61H 2201/0149* (2013.01); *A61H 2201/1409* (2013.01); *A61H 2201/1638* (2013.01)

(58) Field of Classification Search
CPC ...... A61H 1/02; A61H 1/0274; A61H 1/0277; A61H 2201/0149; A61H 2201/1409;
(Continued)

(56) References Cited

U.S. PATENT DOCUMENTS 4,665,900 A * 5/1987 Saringer .............. A61H 1/0274 601/40
4,875,469 A * 10/1989 Brook .................. A61H 1/0288 601/40

(Continued)

OTHER PUBLICATIONS

Patent Cooperation Treaty; International Search Report and Written Opinion cited in PCT/US2020/042652; mailed Oct. 9, 2020; 13 pages.

*Primary Examiner* — Brandy S Lee
(74) *Attorney, Agent, or Firm* — Shumaker, Loop & Kendrick, LLP; Patrick B. Horne; Brandon C. Trego

(57) ABSTRACT

A device is provided for manipulating an arm of a user, thereby providing extension or flexion assistance to the arm about an elbow. The device has an arm engagement system, having an upper arm member with an upper arm frame having a pivot end and a distal end, a posterior elbow pad, a forearm member with a forearm frame having a pivot end and a distal end and a distal wrist pad, and a pivoting connection operatively coupled with the pivot end of the upper arm frame and the pivot end of the forearm frame. A force application system having a force applicator is connected between the distal end and the pivot end of the forearm frame. A force application mechanism is connected at or near the distal end of the upper arm frame.

39 Claims, 22 Drawing Sheets

(58) Field of Classification Search
CPC .... A61H 2201/1638; A61H 2201/0192; A61H 2201/1238; A61H 2201/1276; A61H 2201/1463; A61H 2201/1616; A61H 2201/164; A61H 2201/1676; A61H 2201/5023; A61H 2203/0431; A61F 5/37; A61F 5/3753; A61F 5/3723; A61F 5/373; A61G 13/12; A61G 13/0036; A61G 13/1235
See application file for complete search history.

(56) References Cited

U.S. PATENT DOCUMENTS

| | | | | |
|---|---|---|---|---|
| 6,179,800 | B1 * | 1/2001 | Torrens | A61F 5/012 602/5 |
| 6,824,498 | B2 * | 11/2004 | Hassler | A61H 1/0281 482/126 |
| 2003/0130600 | A1 * | 7/2003 | Branch | A61H 1/0281 601/5 |
| 2004/0243025 | A1 * | 12/2004 | Peles | A61H 1/0277 601/5 |
| 2009/0264799 | A1 | 10/2009 | Bonutti et al. | |
| 2014/0240109 | A1 | 8/2014 | Aviles et al. | |
| 2016/0287422 | A1 * | 10/2016 | Kelly | A61F 5/0127 |
| 2017/0132947 | A1 * | 5/2017 | Maeda | G05G 9/047 |
| 2017/0281387 | A1 * | 10/2017 | Mathie | A61F 5/0102 |
| 2017/0347945 | A1 * | 12/2017 | Branch | A61B 5/6829 |
| 2019/0054346 | A1 | 2/2019 | Tuononen et al. | |

* cited by examiner

DEVICE FOR ASSISTING WITH EXTENSION AND/OR FLEXION

FIELD OF THE INVENTION

The present invention is generally directed to orthotic devices and more particularly to orthotic devices designed to improve and promote gains in range of motion in a joint by use of hydraulic systems and/or mechanical lever systems.

BACKGROUND

When a joint is damaged either from an injury event or through surgical intervention, scar tissue may form and limit the motion of the joint. This loss of motion can greatly affect a person's quality of life by limiting their ability to accomplish their normal activities of daily living. Traditionally, orthotics are separated into two categories: those that support and protect limbs and those that attempt to return range of motion to the joint by application of force.

Different joints are capable of moving in different directions, and the full range of motion of a joint depends upon the anatomy of that joint and on the particular genetics of each individual. Joint motion can generally be classified as linear or rotational. For example, linear joint motions include flexion and extension where flexion is defined as a bending of the joint and extension is often defined as a straightening of the joint. Rotational motions include proration and supination, which is where the hand rotates around the longitudinal axis of the forearm placing the palm up or the palm down.

Conventional orthotic devices have attempted to provide support across a joint, traditionally utilizing a rigid member or hinged joint. Orthotics aim to protect the joint by supporting the joint.

Some devices use a hinge system to apply a low load force on the joint by tightening a spring and thus stretching accumulated scar tissue over a long period of time. Some use a cuff for each limb segment and are uncomfortable and must be worn for hours at a time to be effective.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing a device for manipulating an arm of a user, thereby providing extension or flexion assistance to the arm about an elbow, the device having an arm engagement system. The arm engagement system has an upper arm member with an upper arm frame having a pivot end and a distal end, a posterior elbow pad configured to engage a back of the user's elbow, a forearm member with a forearm frame having a pivot end and a distal end and a distal wrist pad configured to engage a wrist of the user, and a pivoting connection operatively coupled with the pivot end of the upper arm frame and the pivot end of the forearm frame. The upper arm member and the forearm member are configured to pivot about the pivoting connection on an axis defined by the elbow as the arm of the user extends or flexes about the elbow. A force application system having a force applicator is connected between the distal end and the pivot end of the forearm frame. A force application mechanism is connected at or near the distal end of the upper arm frame, wherein the force application mechanism is configured to apply a force to the force applicator, thereby providing the extension or flexion assistance to the arm about the elbow.

According to another embodiment of the invention, the upper arm member includes an anterior upper arm pad configured to engage an upper arm of the user.

According to another embodiment of the invention, the force application mechanism is a hydraulic cylinder.

According to another embodiment of the invention, the hydraulic cylinder is powered by a hand pump adapted for use with an arm of the user not being manipulated.

According to another embodiment of the invention, the force application mechanism is a gear based mechanical system.

According to another embodiment of the invention, the arm engagement system is mounted on an upright member positioned on a side of the user.

According to another embodiment of the invention, the arm engagement system is adapted to move in a vertical direction along the length of the upright member for adapting to users of different heights.

According to another embodiment of the invention, the upper arm member is connected to the upright member at a position proximate to the pivot end of the upper arm frame.

According to another embodiment of the invention, the anterior upper arm pad is adapted to adjust in a direction perpendicular to the upper arm member for adapting to users of different arm sizes.

According to another embodiment of the invention, the anterior upper arm pad is adapted to adjust in a direction along the length of the upper arm member for adapting to users of different arm sizes.

According to another embodiment of the invention, the anterior upper arm pad is adapted to rotate around an axis perpendicular to the upper arm member for adapting to users of different arm sizes.

According to another embodiment of the invention, the anterior upper arm pad is adapted to rotate 180 degrees around an axis perpendicular to the upper arm member for use on an opposite arm of the user.

According to another embodiment of the invention, the posterior elbow pad is adapted to adjust in a direction perpendicular to the upper arm member for adapting to users of different arm sizes.

According to another embodiment of the invention, the posterior elbow pad is adapted to adjust in a direction along the length of the upper arm member for adapting to users of different arm sizes.

According to another embodiment of the invention, the posterior elbow pad is adapted to rotate around an axis perpendicular to the upper arm member for adapting to users of different arm sizes.

According to another embodiment of the invention, the posterior elbow pad is adapted to rotate 180 degrees around an axis perpendicular to the upper arm member for use on an opposite arm of the user.

According to another embodiment of the invention, the distal wrist pad is adapted to engage an anterior side of the wrist when the elbow is in flexion and the posterior side of the wrist when the elbow is in extension.

According to another embodiment of the invention, the distal wrist pad is adapted to adjust in a direction along the length of the forearm member for adapting to users of different arm sizes.

According to another embodiment of the invention, the distal wrist pad is adapted to rotate around an axis perpendicular to the forearm member for adapting to users of different arm sizes.

According to another embodiment of the invention, the posterior elbow pad and the distal wrist pad include a cushion for user comfort.

According to another embodiment of the invention, the anterior upper arm pad includes a cushion for user comfort.

According to another embodiment of the invention, the anterior upper arm pad is adapted to adjust in a direction perpendicular to the upper arm of the user for adapting to users of different arm sizes.

According to another embodiment of the invention, the anterior upper arm pad is adapted to adjust in a direction along the length of the upper arm of the user for adapting to users of different arm sizes.

According to another embodiment of the invention, the anterior upper arm pad is adapted to rotate around an axis perpendicular to the upper arm of the user for adapting to users of different arm sizes.

According to another embodiment of the invention, the anterior upper arm pad is adapted to rotate 180 degrees around an axis perpendicular to the upper arm of the user for use on an opposite arm of the user.

According to another embodiment of the invention, the posterior elbow pad is adapted to adjust in a direction perpendicular to the upper arm of the user for adapting to users of different arm sizes.

According to another embodiment of the invention, the posterior elbow pad is adapted to adjust in a direction along the length of the upper arm of the user for adapting to users of different arm sizes.

According to another embodiment of the invention, the posterior elbow pad is adapted to rotate around an axis perpendicular to the upper arm of the user for adapting to users of different arm sizes.

According to another embodiment of the invention, the posterior elbow pad is adapted to rotate 180 degrees around an axis perpendicular to the upper arm of the user for use on an opposite arm of the user.

According to another embodiment of the invention, the distal wrist pad is adapted to adjust in a direction along the length of the forearm of the user for adapting to users of different arm sizes.

According to another embodiment of the invention, the distal wrist pad is adapted to rotate around an axis perpendicular to the forearm of the user for adapting to users of different arm sizes.

According to another embodiment of the invention, the anterior upper arm pad is adapted to adjust in a direction perpendicular to the upper arm of the user for adapting to users of different arm sizes, adjust in a direction along the length of the upper arm of the user for adapting to users of different arm sizes, and rotate around an axis perpendicular to the upper arm of the user for adapting to users of different arm sizes.

According to another embodiment of the invention, the posterior elbow pad is adapted to adjust in a direction perpendicular to the upper arm of the user for adapting to users of different arm sizes, adjust in a direction along the length of the upper arm of the user for adapting to users of different arm sizes, and rotate around an axis perpendicular to the upper arm of the user for adapting to users of different arm sizes.

According to another embodiment of the invention, the posterior elbow pad is adapted to rotate 180 degrees around an axis perpendicular to the upper arm of the user for use on an opposite arm of the user.

According to another embodiment of the invention, the anterior upper arm pad is adapted to rotate 180 degrees around an axis perpendicular to the upper arm of the user for use on an opposite arm of the user.

According to another embodiment of the invention, a device is provided for manipulating an arm of a user, thereby providing extension or flexion assistance to the arm about an elbow, the device comprising an arm engagement system. The arm engagement system has an upper arm member comprising an upper arm frame having a pivot end and a distal end, a posterior elbow pad cantilevered outward in a perpendicular direction from the upper arm frame and positioned proximate to the pivot end of the upper arm frame and configured to engage a back of the user's elbow. A forearm member has a forearm frame having a pivot end and a distal end and a distal wrist pad cantilevered outward in a perpendicular direction from the forearm frame and positioned proximate to the distal end of the forearm frame and configured to engage a wrist of the user. A pivoting connection is operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow. A force application system has a force applicator connected between the distal end and the pivot end of the forearm frame, and a force application mechanism connected at or near the distal end of the upper arm frame. Wherein the force application mechanism is configured to apply a force to the force applicator, thereby providing the extension or flexion assistance to the arm about the elbow.

According to another embodiment of the invention, a device is provided for manipulating an arm of a user, thereby providing extension or flexion assistance to the arm about an elbow, the device has a frame having spaced apart first and second mounting locations. An arm engagement system is configured to be mounted to 1) the first mounting location or 2) the second mounting location. An upper arm member has an upper arm frame having a pivot end and a distal end, and a posterior elbow pad configured to engage a back of the user's elbow. A forearm member having a forearm frame having a pivot end and a distal end and a distal wrist pad configured to engage a wrist of the user. A pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow. A force application system has a force applicator connected between the distal end and the pivot end of the forearm frame and a force application mechanism which is connected at or near the distal end of the upper arm frame, wherein the force application mechanism is configured to apply a force to the force applicator, thereby providing the extension or flexion assistance to the arm about the elbow. A power unit is configured to be mounted to 1) the second mounting location if the arm engagement system is mounted to the first mounting location or 2) the first mounting location if the arm engagement system is mounted to the second mounting location, and adapted to provide power to the force application mechanism.

According to another embodiment of the invention, the power unit includes a lever adapted to move about a fulcrum, a hand grip positioned on an end of the lever opposite to the fulcrum, and whereby when the hand grip is moved by the user, the lever rotates about the fulcrum to generate power.

According to another embodiment of the invention, the lever is connected to a power hydraulic cylinder.

According to another embodiment of the invention, a method is provided for manipulating body parts of a user, thereby providing extension or flexion assistance to the arm of the user about an elbow joint of the user by first engaging an upper arm of the user with an upper arm member of an arm engagement system. Next by engaging a forearm of the user with a forearm member of the arm engagement system, wherein the forearm member is operatively coupled to the upper arm member at a pivoting connection, and wherein the upper arm member and the forearm member are configured to pivot about the pivoting connection on an axis defined by the elbow joint of the user. Lastly by activating a force application mechanism to apply an incremental force to a first end of a force applicator, wherein a second end of the force applicator is operatively coupled to the body part engagement system, and wherein the applied incremental force causes a length between the first end of the force applicator and the second end of the force applicator to shorten, thereby causing extension or flexion of the arm engagement system and the arm of the user.

According to another embodiment of the invention, the step of activating the force application mechanism further includes the step of the user moving a lever on a power unit which provides power to the force application mechanism.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
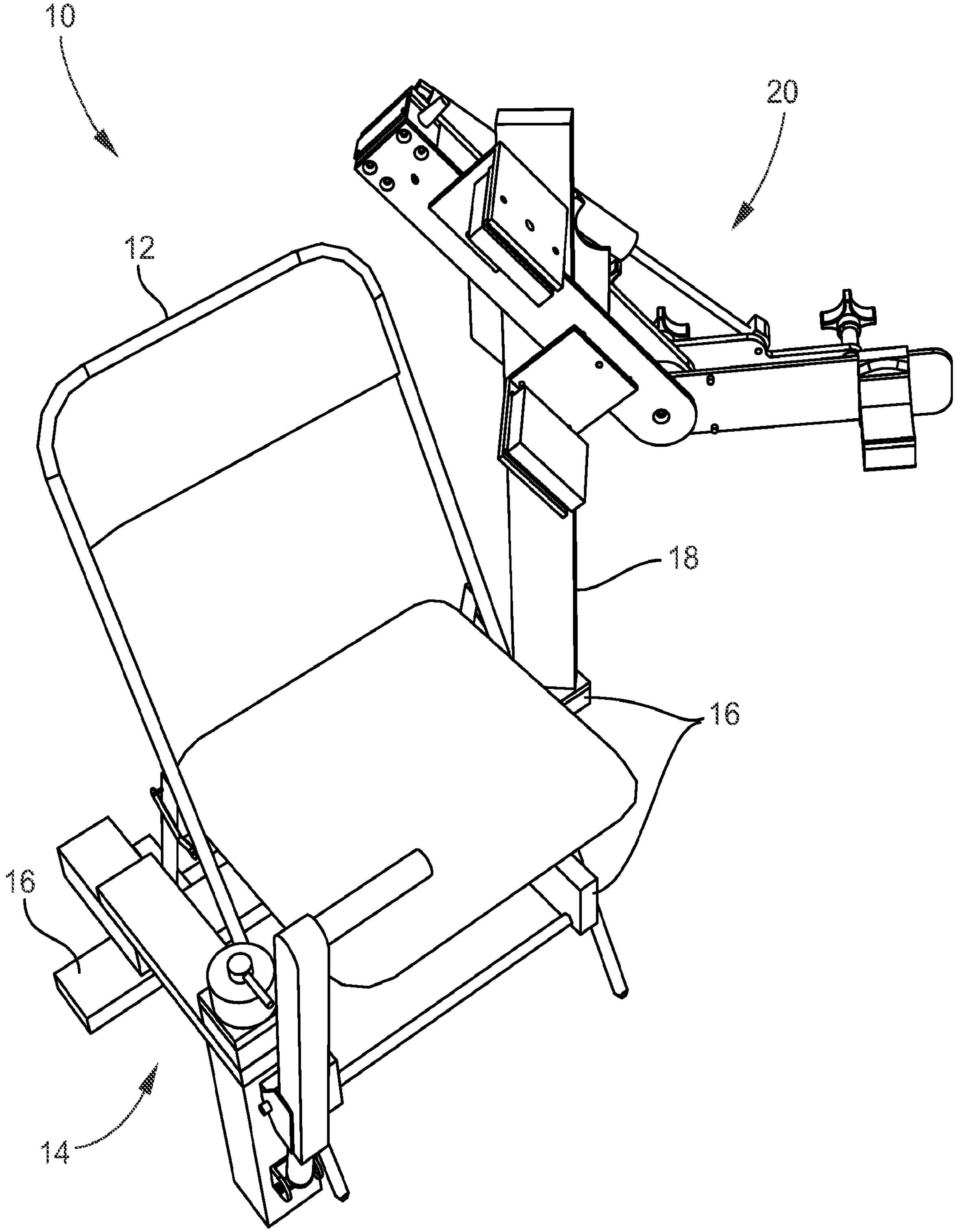
Figure 2:
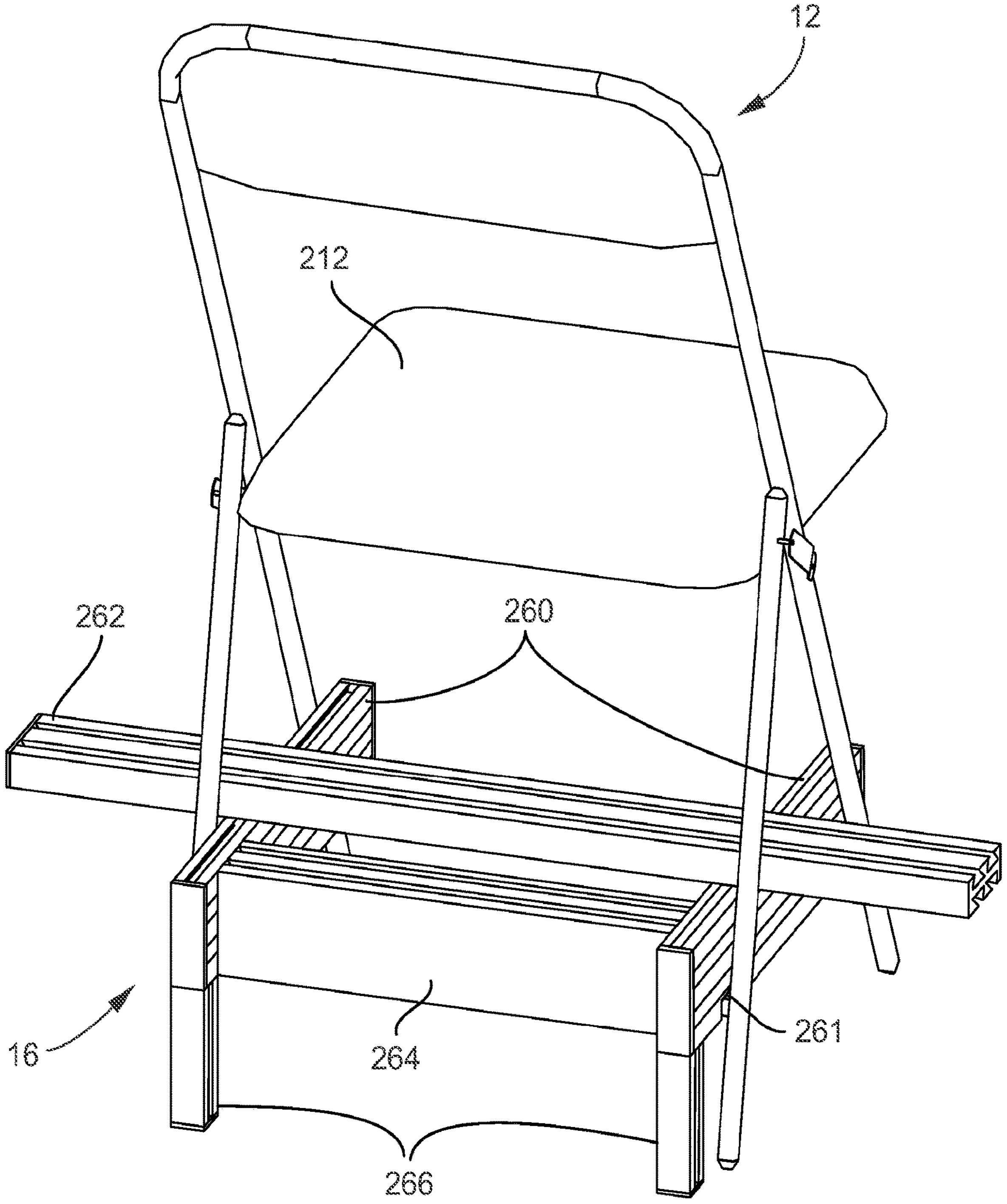
Figure 3:
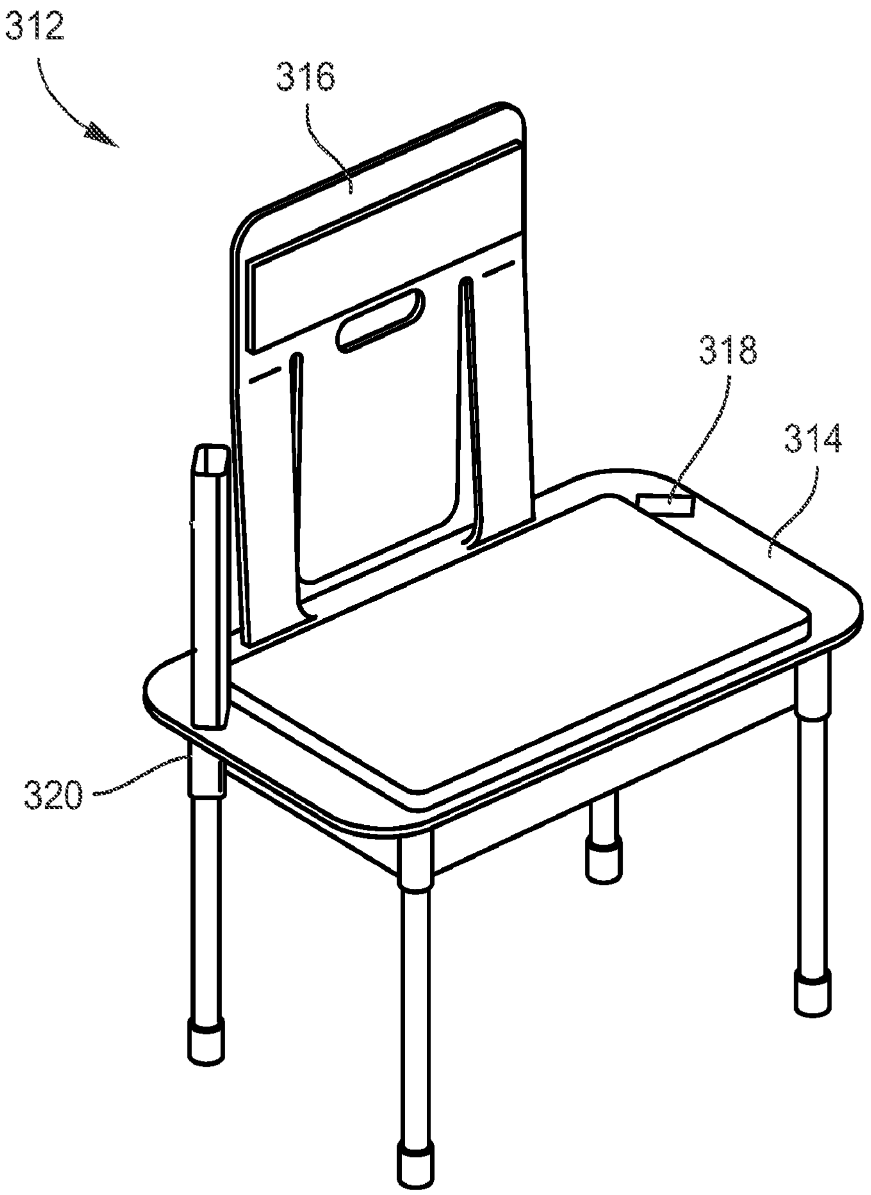
Figure 4:
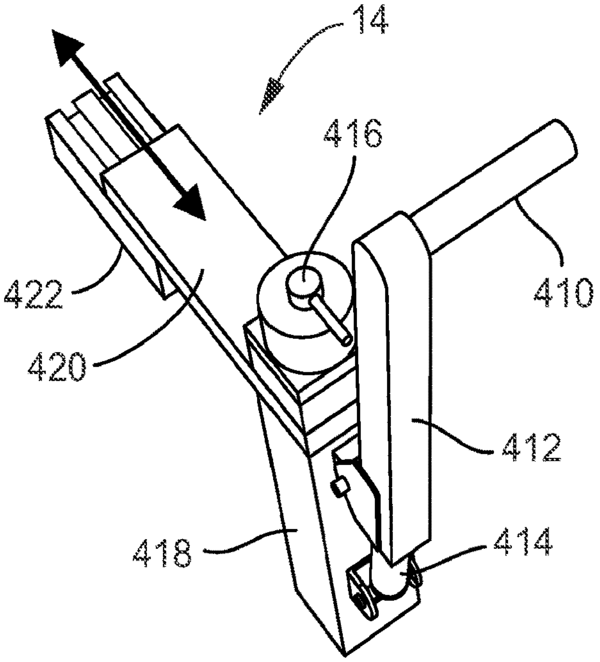
Figure 5:
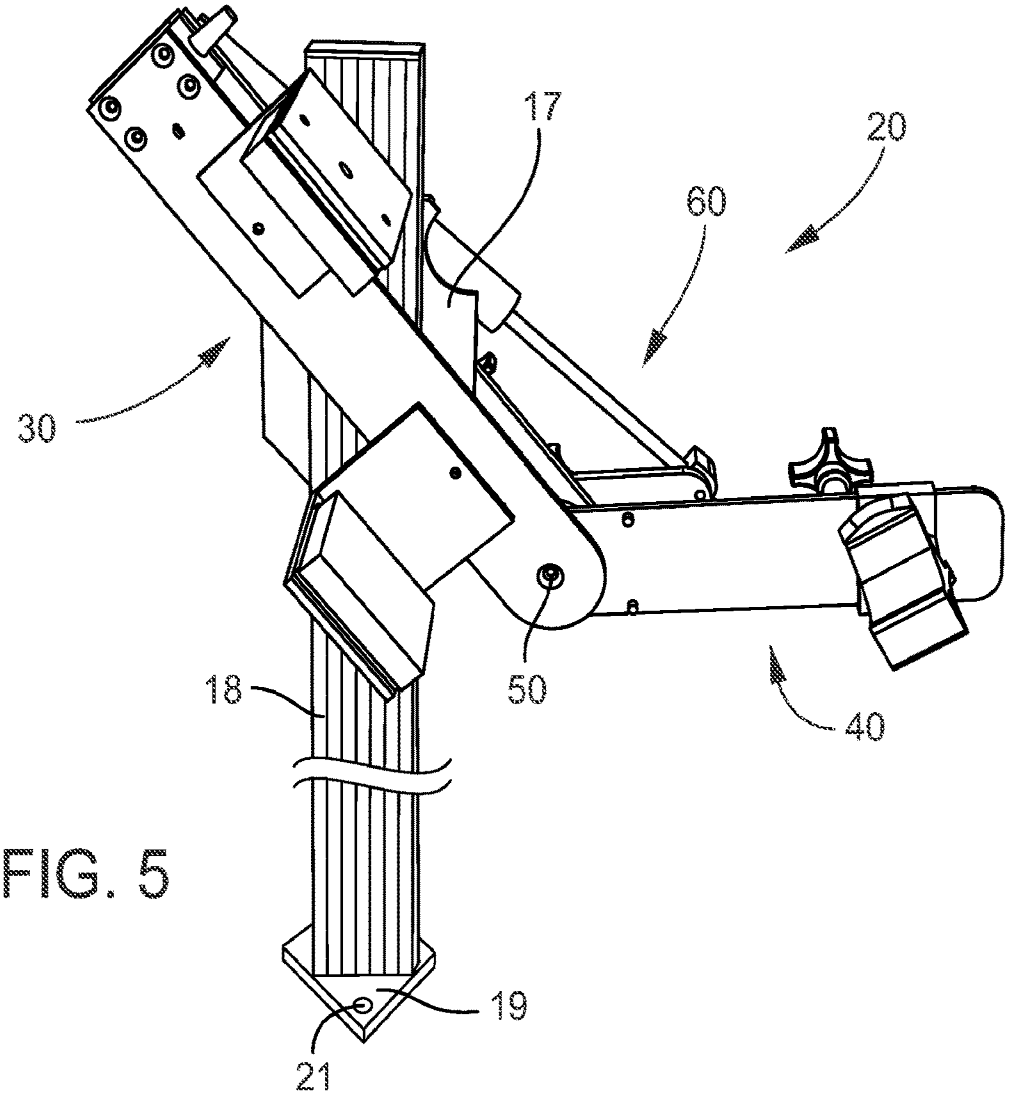
Figure 6:
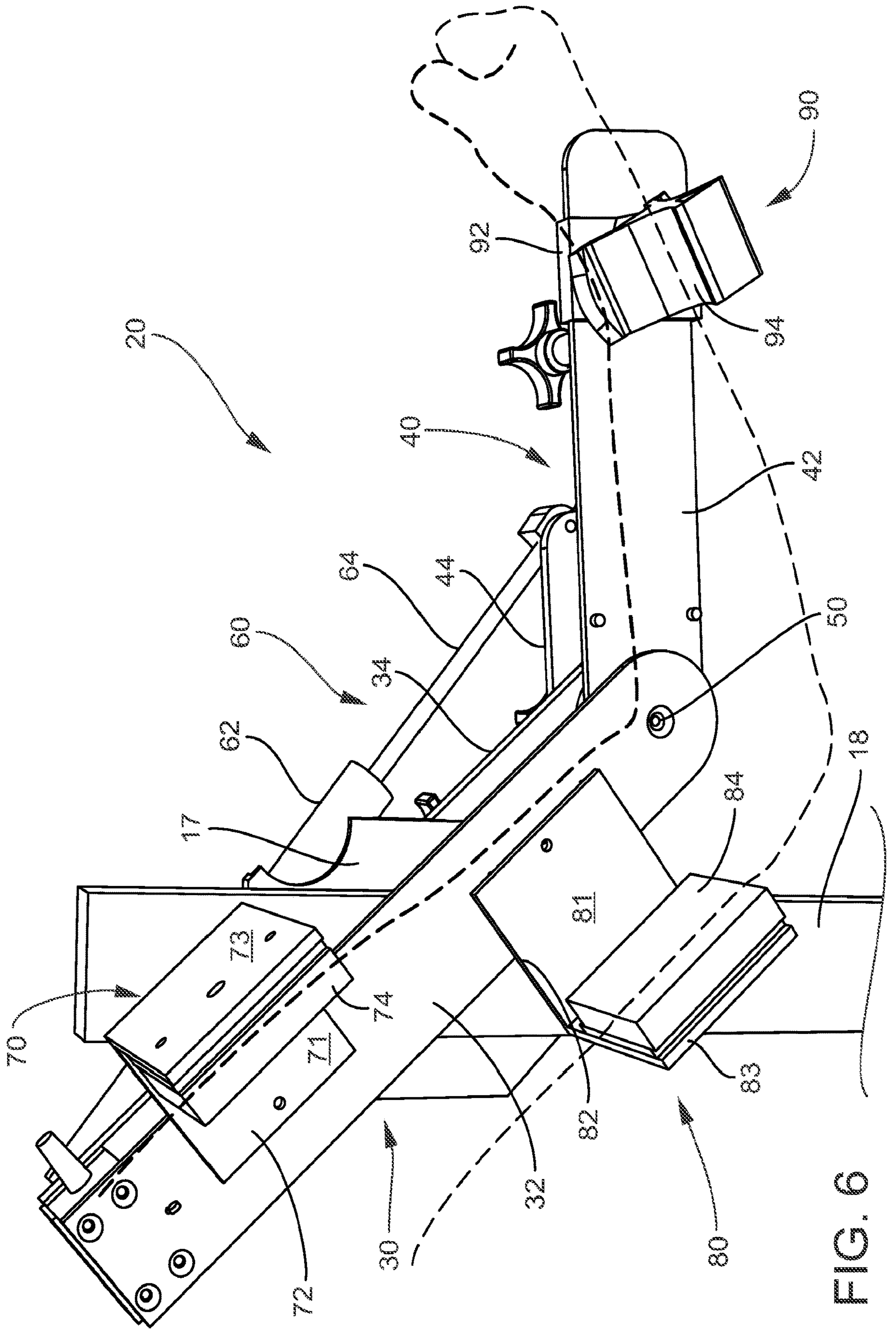
Figure 7:
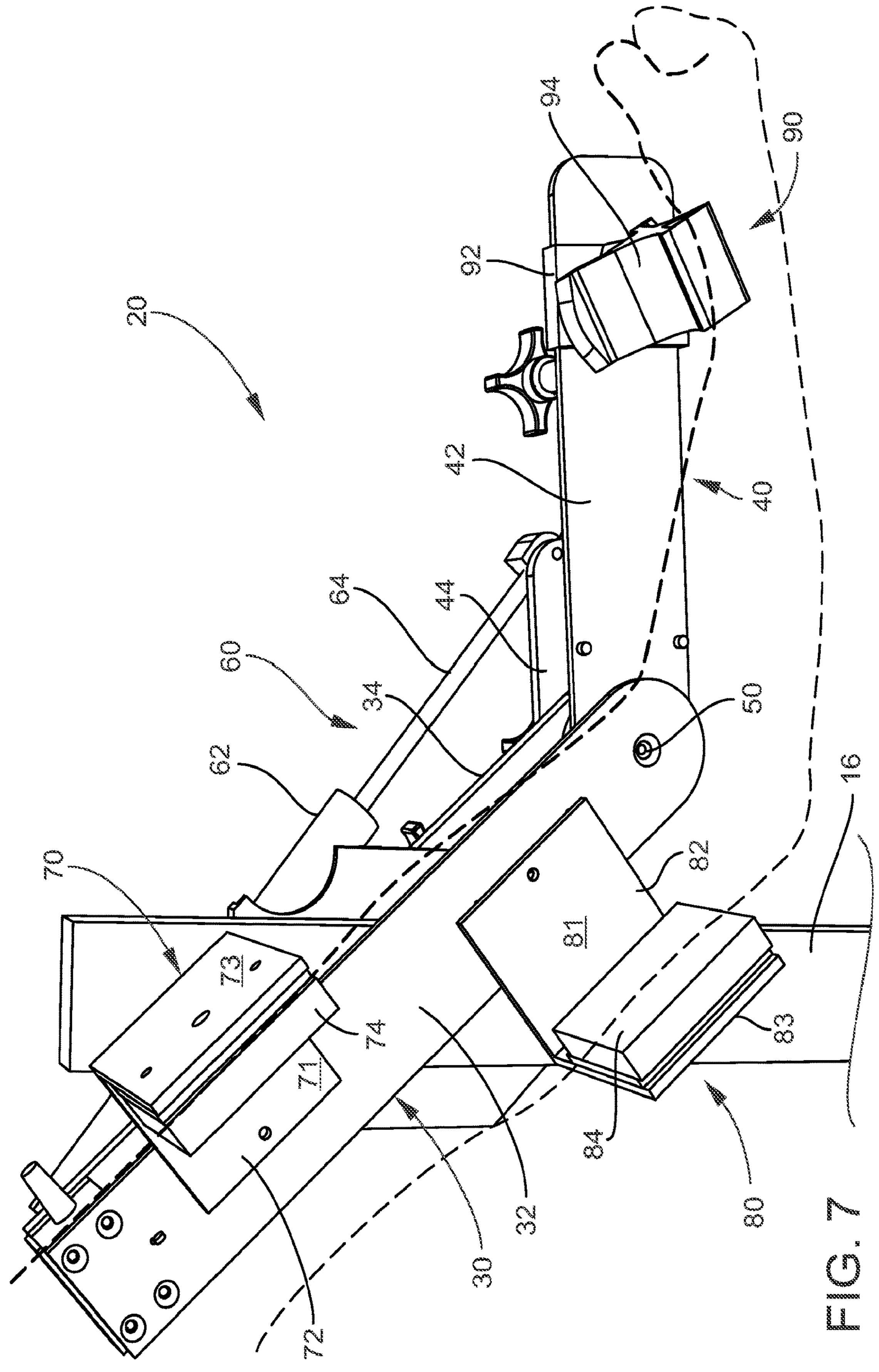
Figure 8:
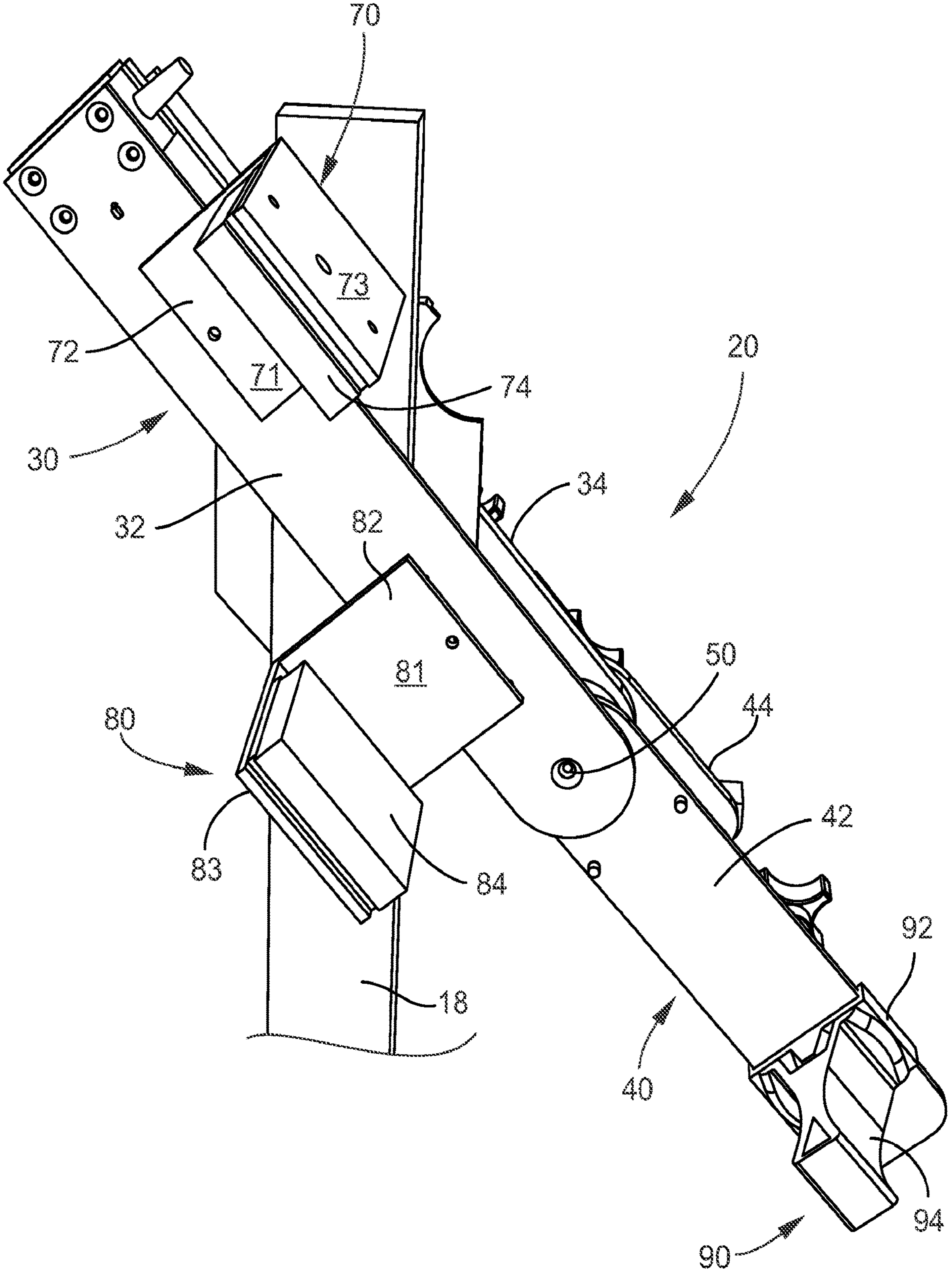
Figure 9:
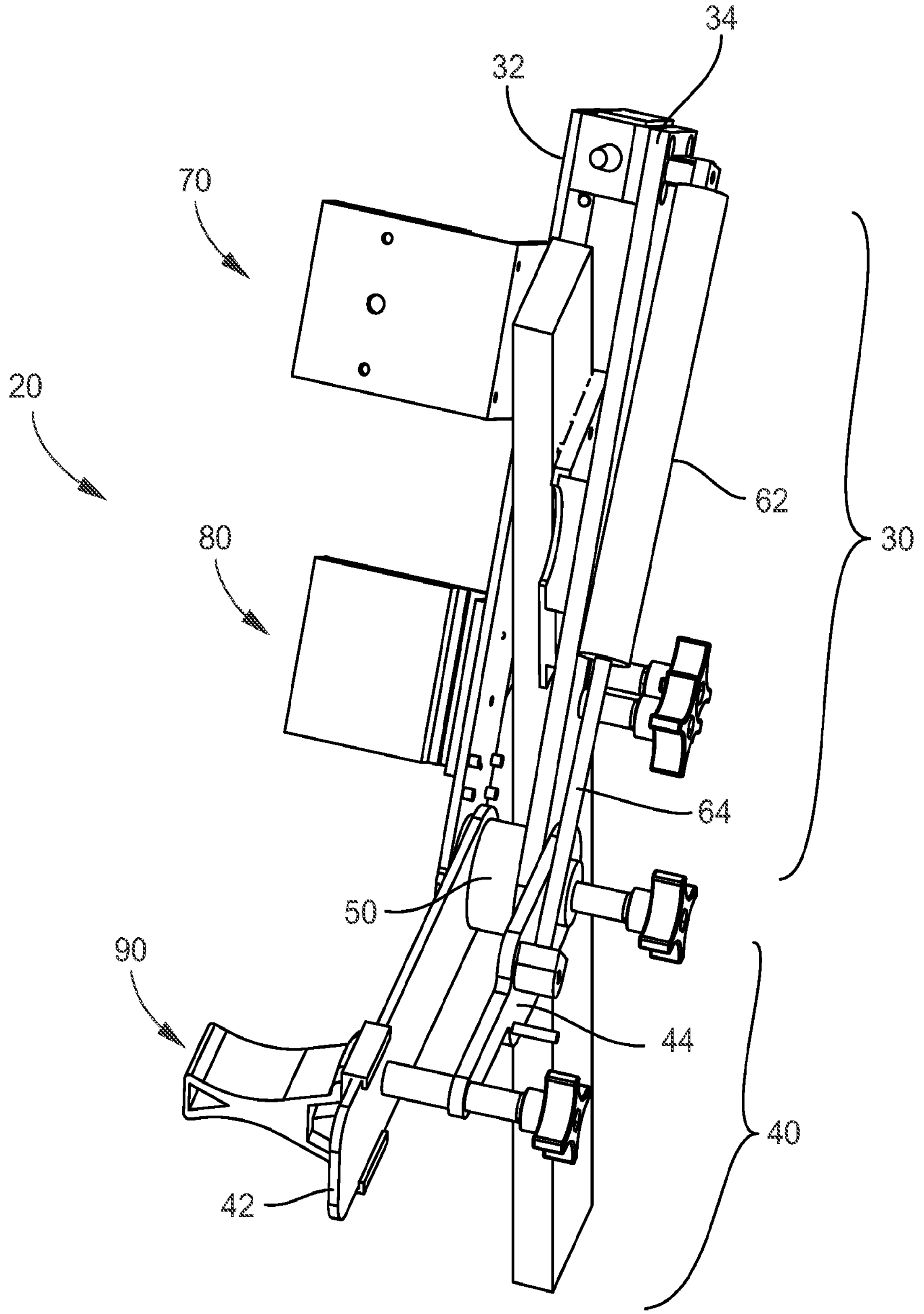
Figure 10:
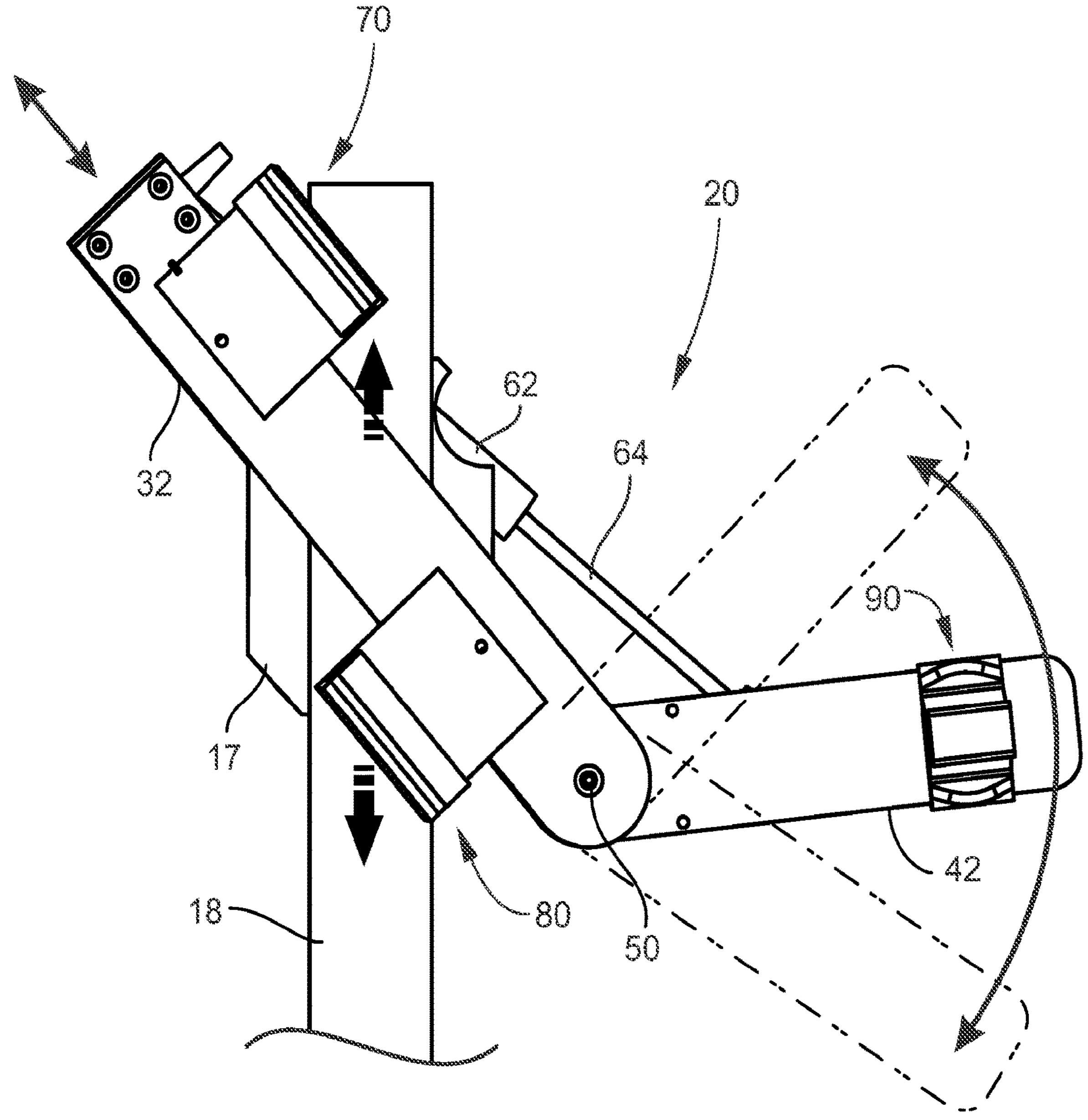
Figure 11:
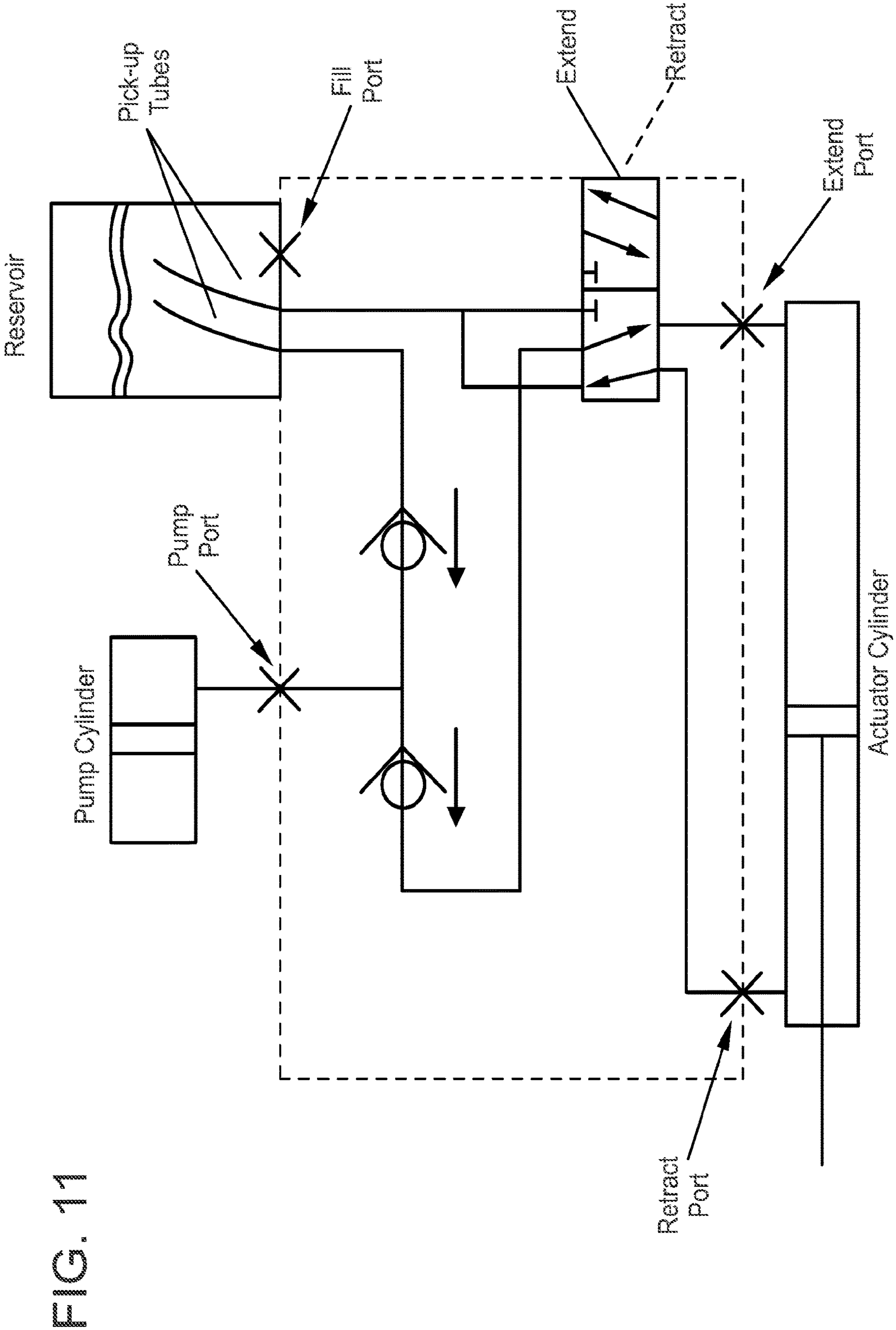
Figure 12:
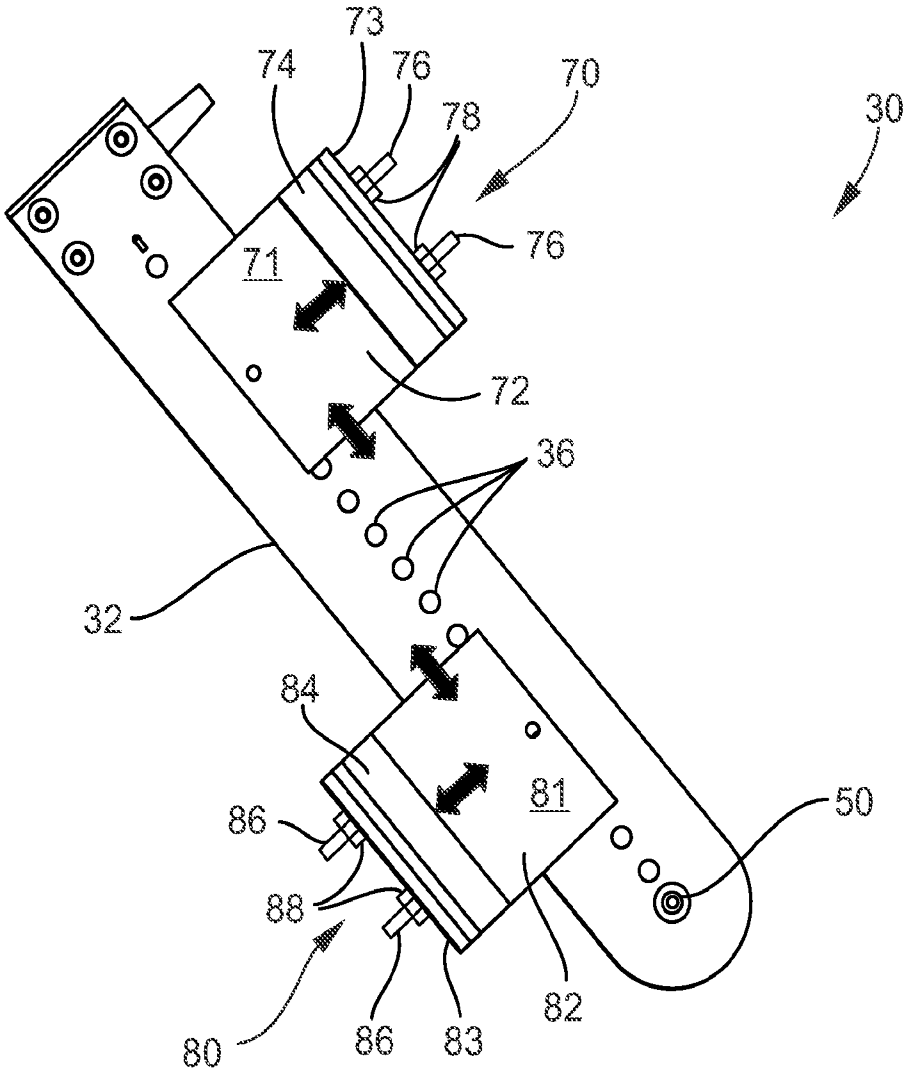
Figure 13:
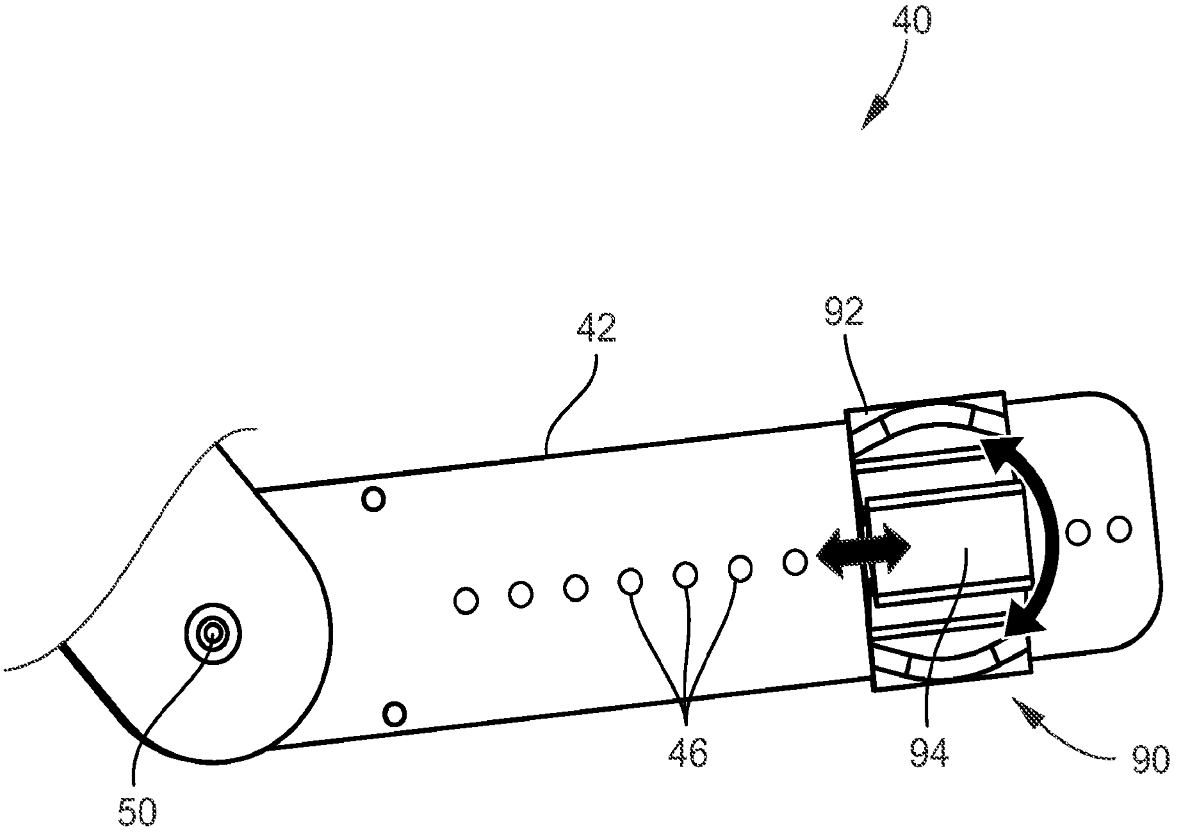
Figure 14A:
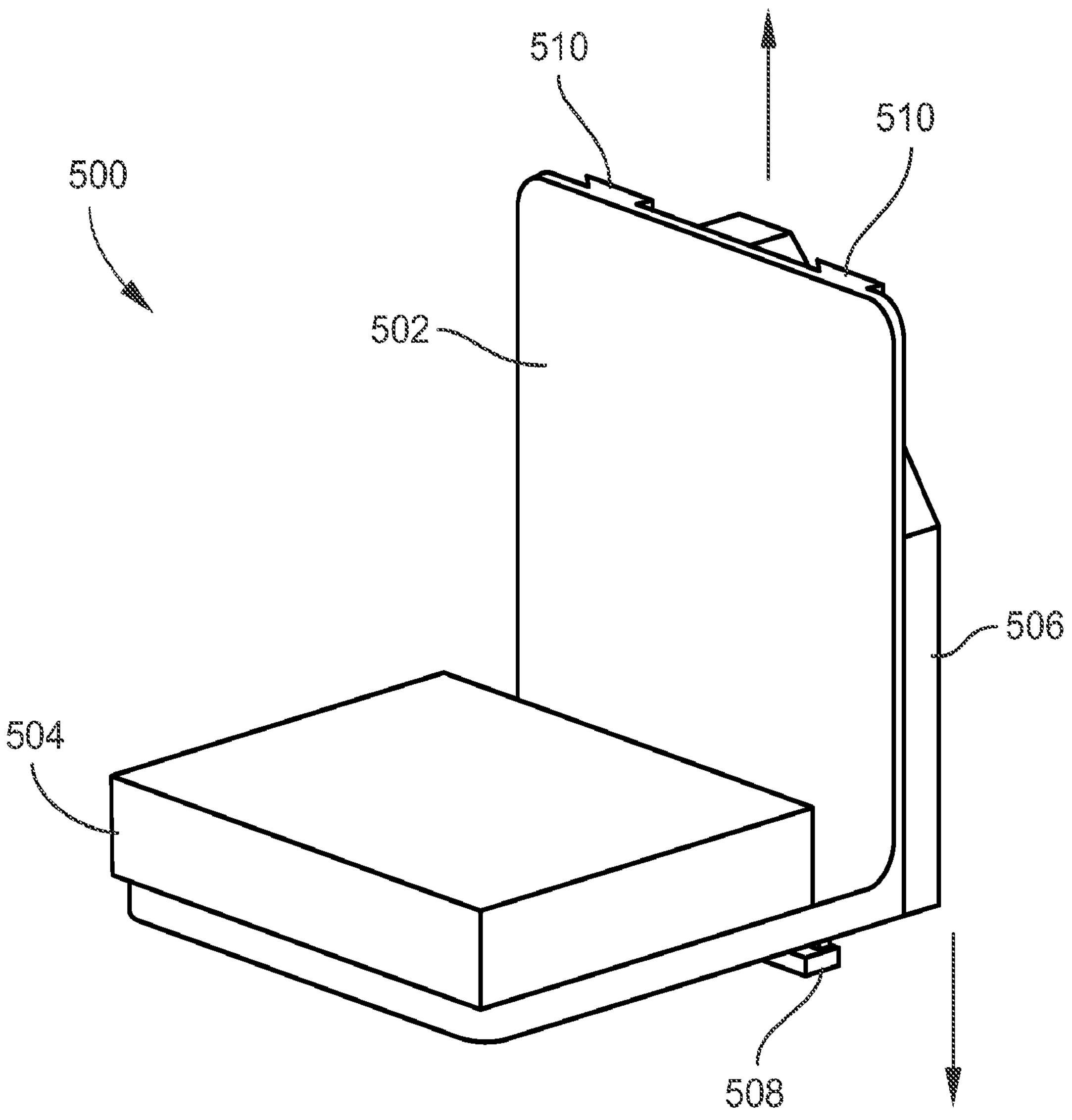
Figure 14B:
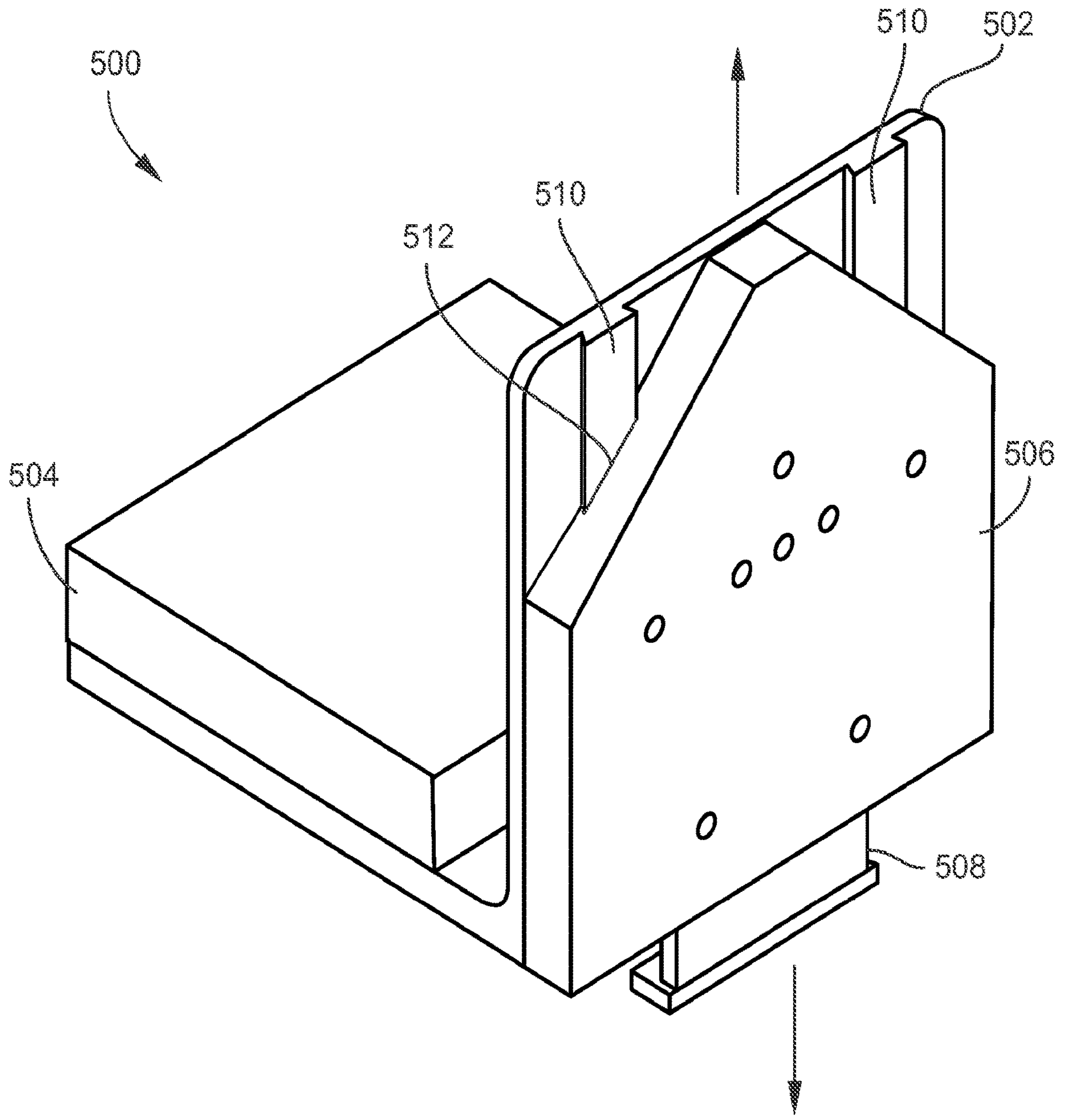
Figure 15A:
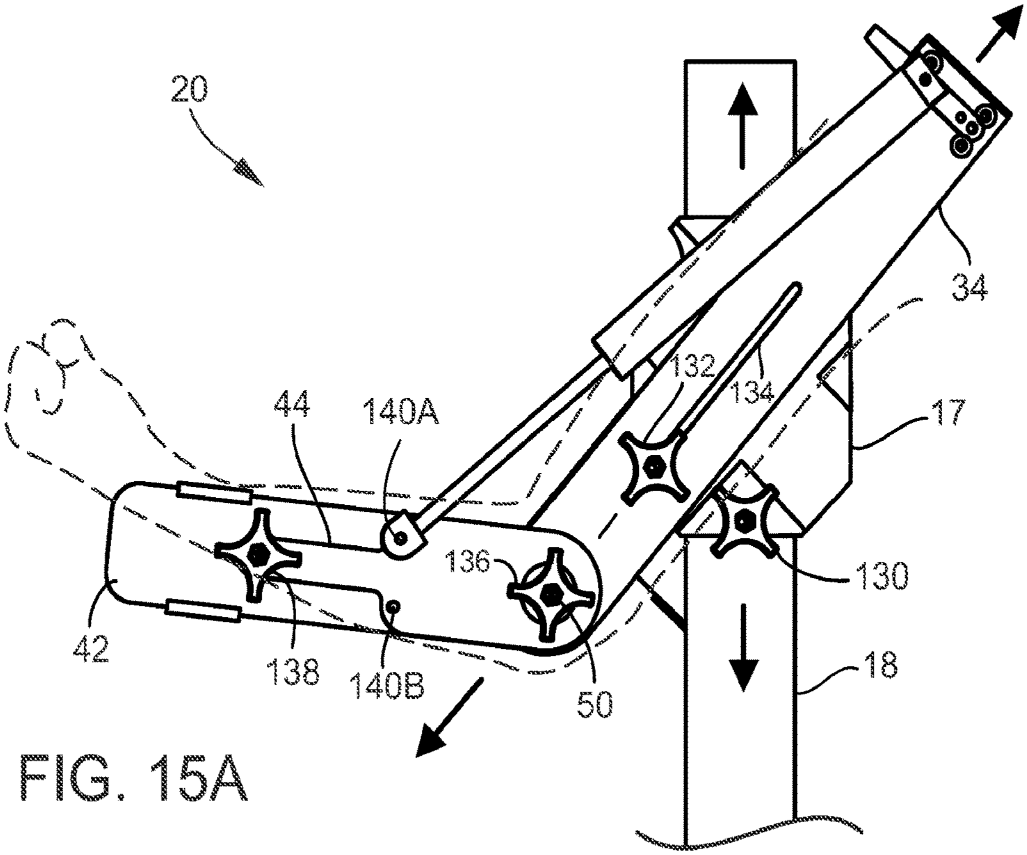
Figure 15B:
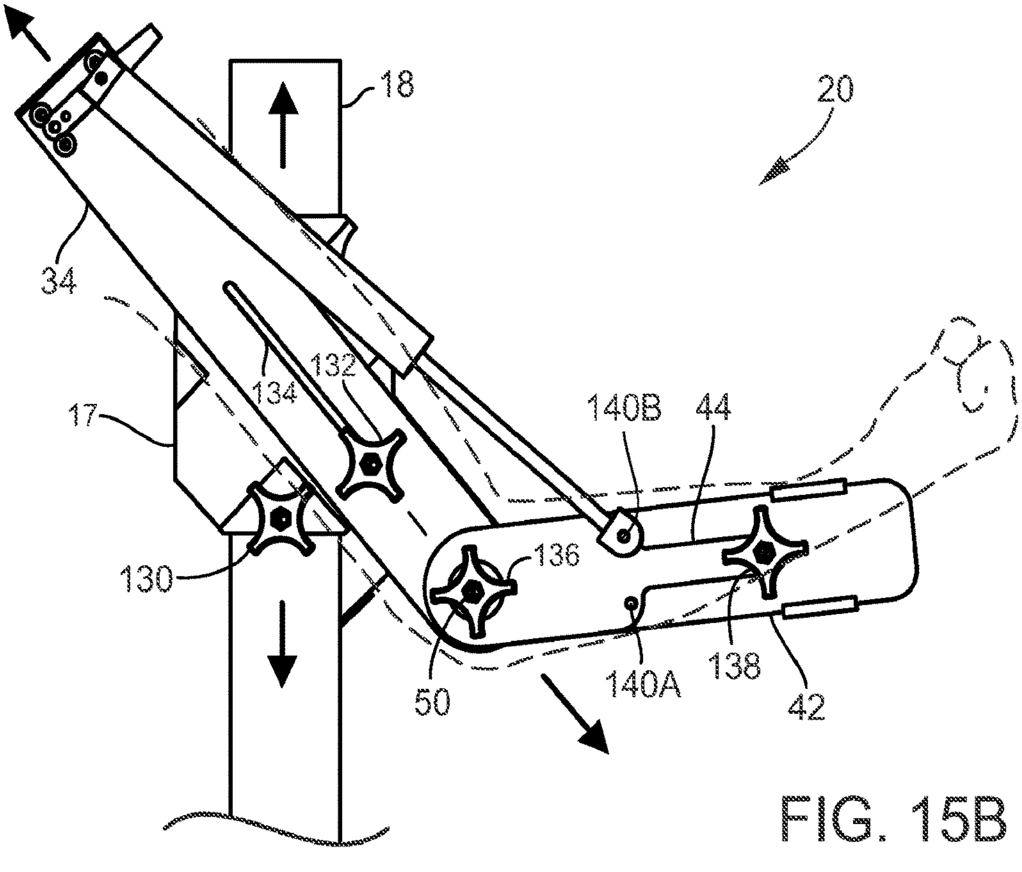
Figure 16:
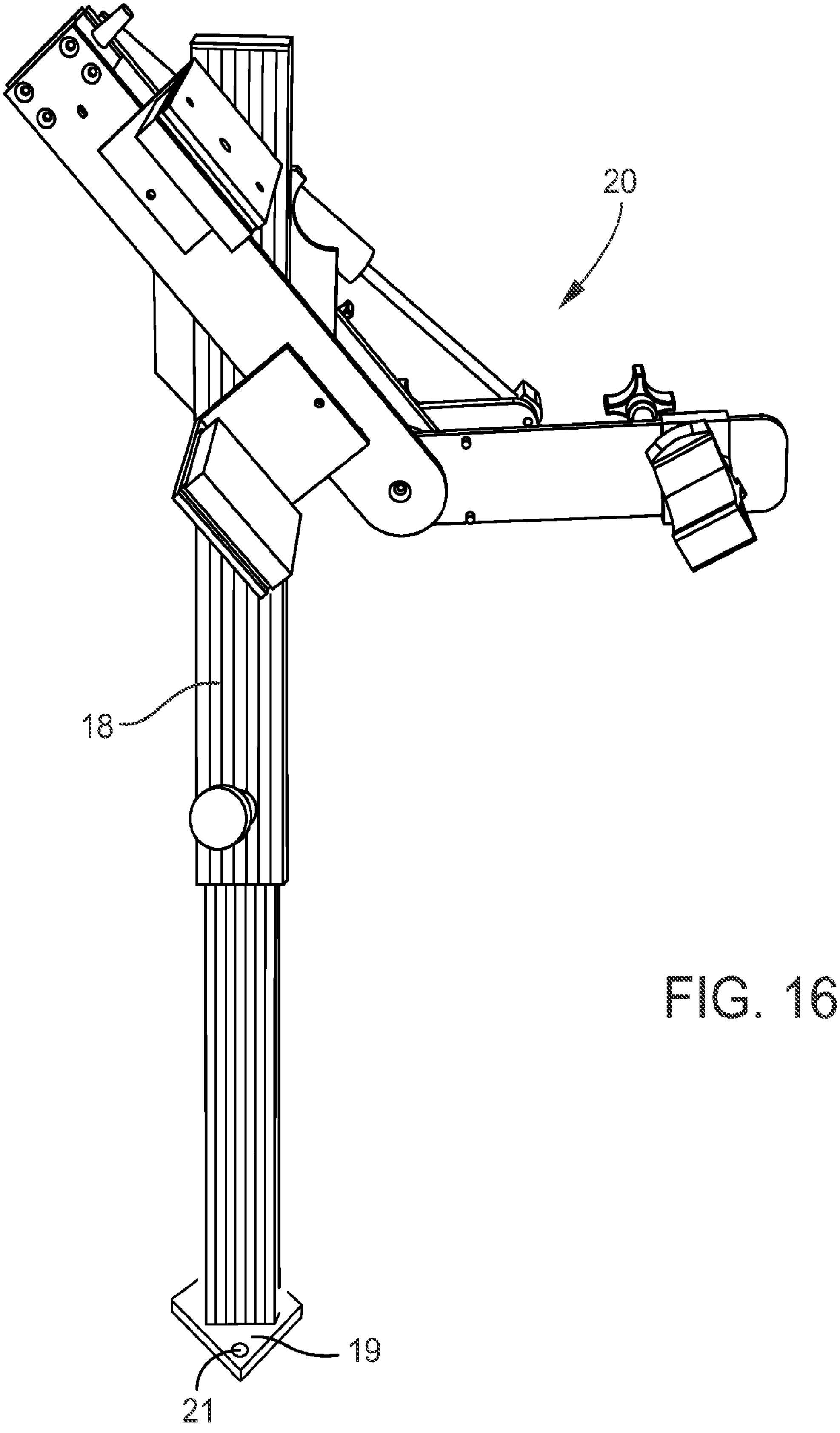
Figure 17:
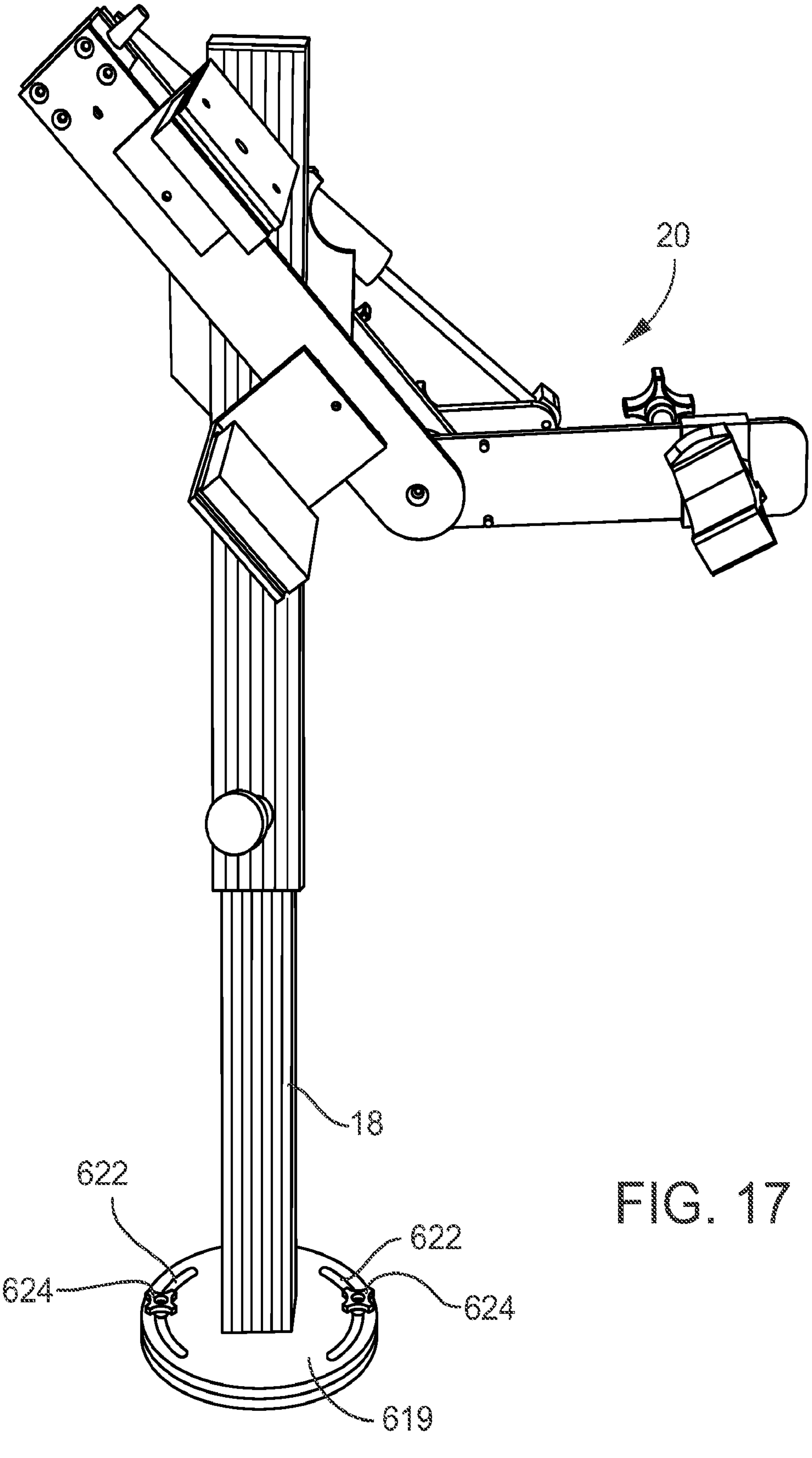
Figure 18:
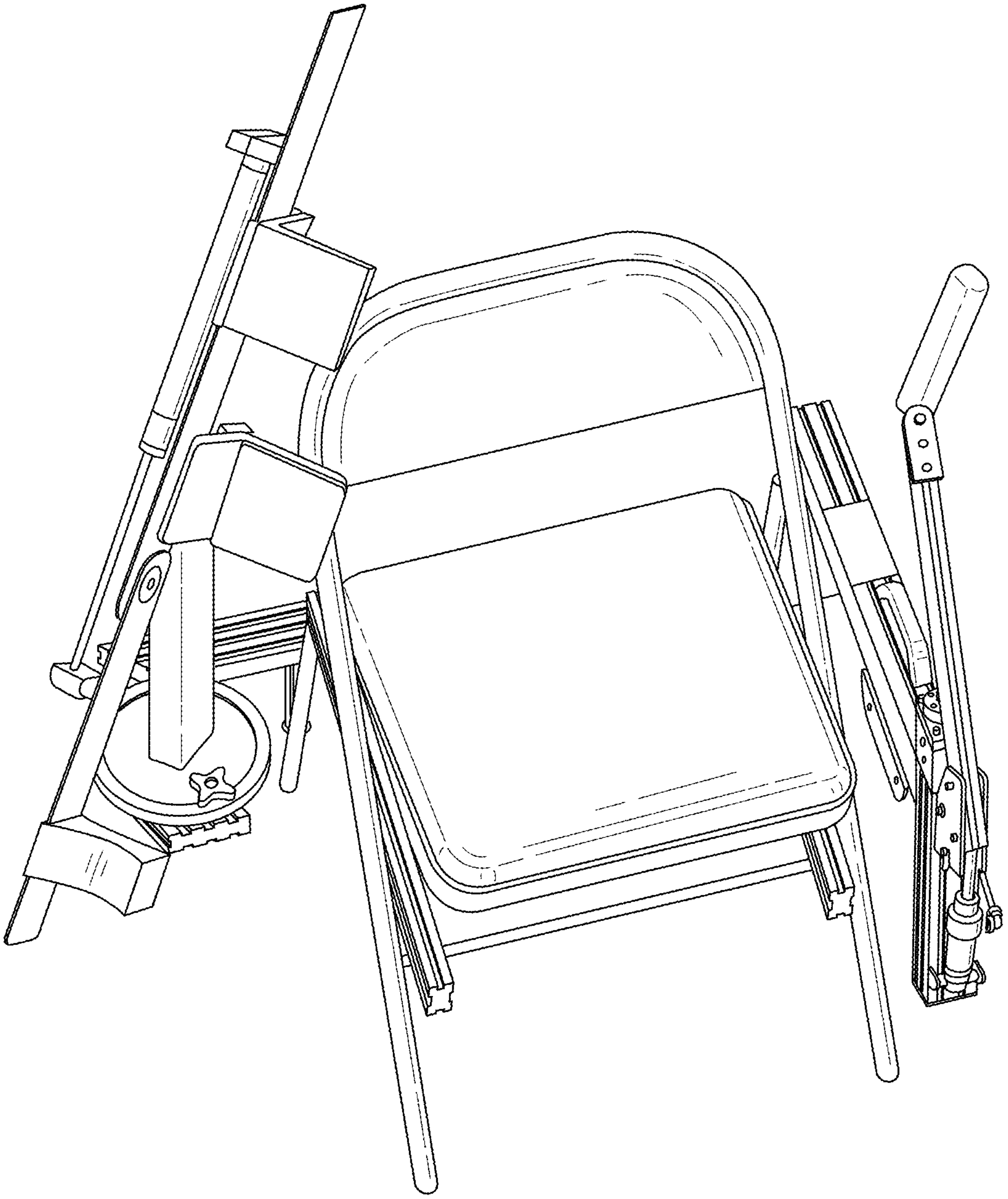
Figure 19:
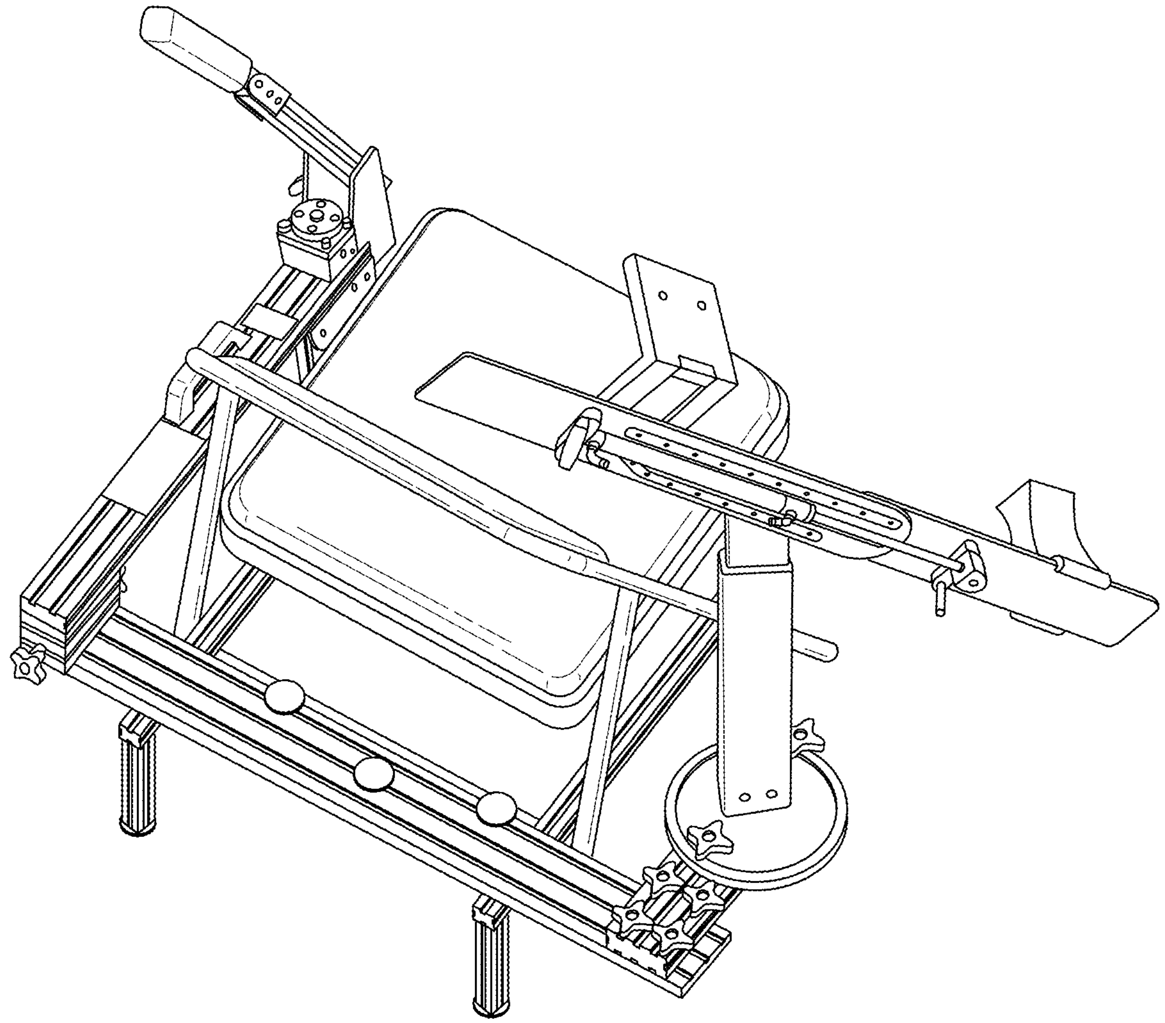
Figure 20:
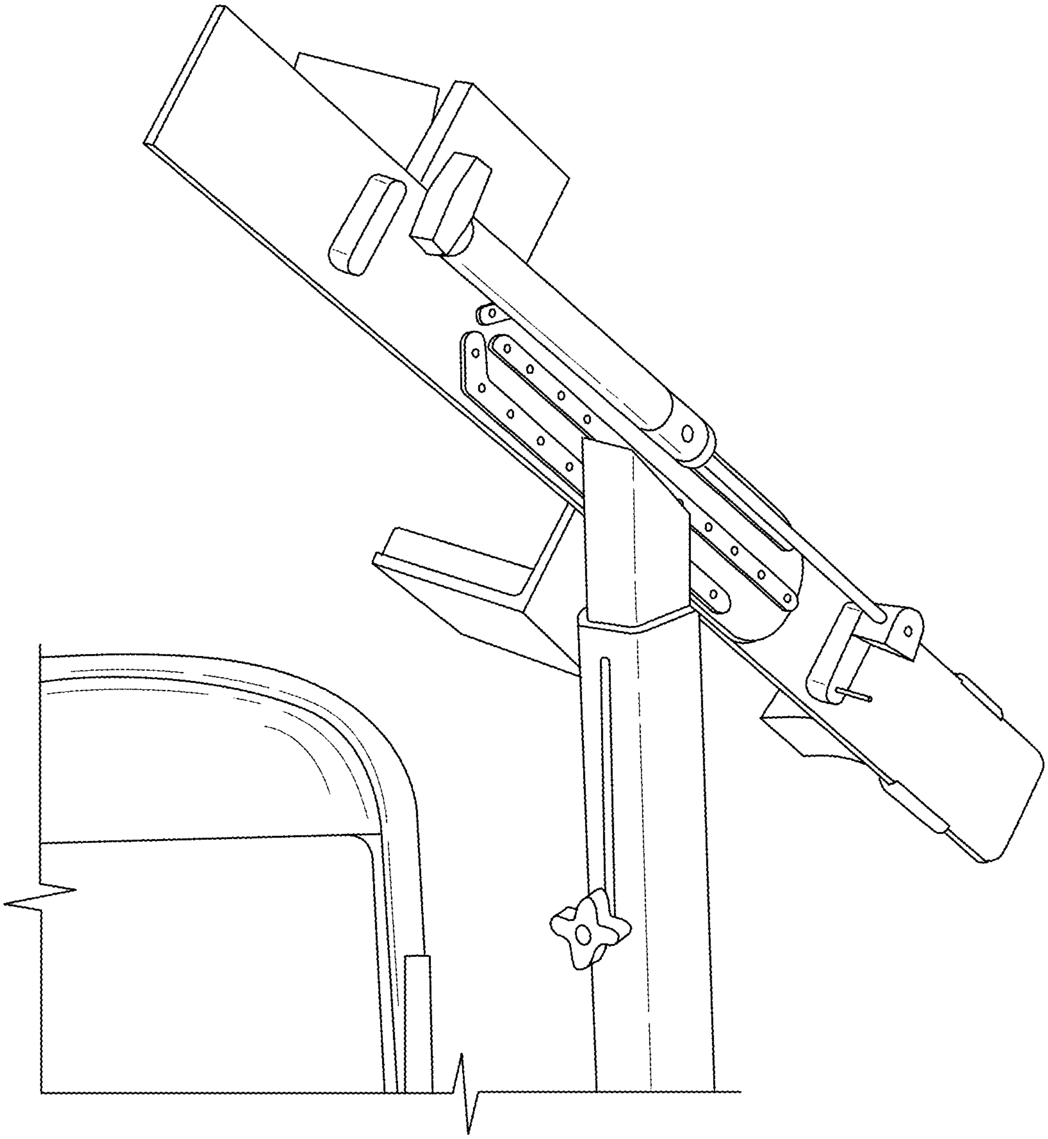
Figure 21:
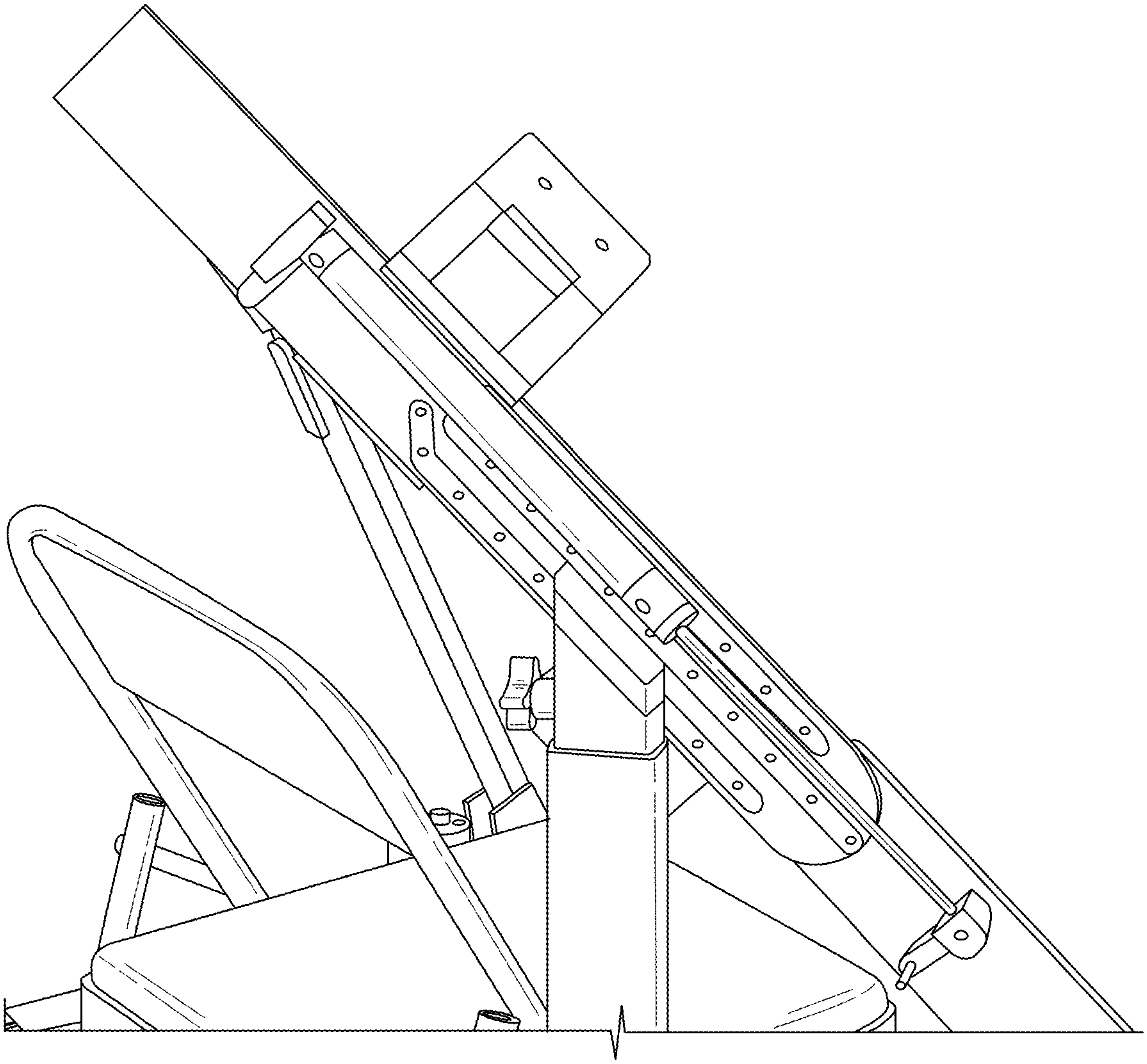
Figure 22:
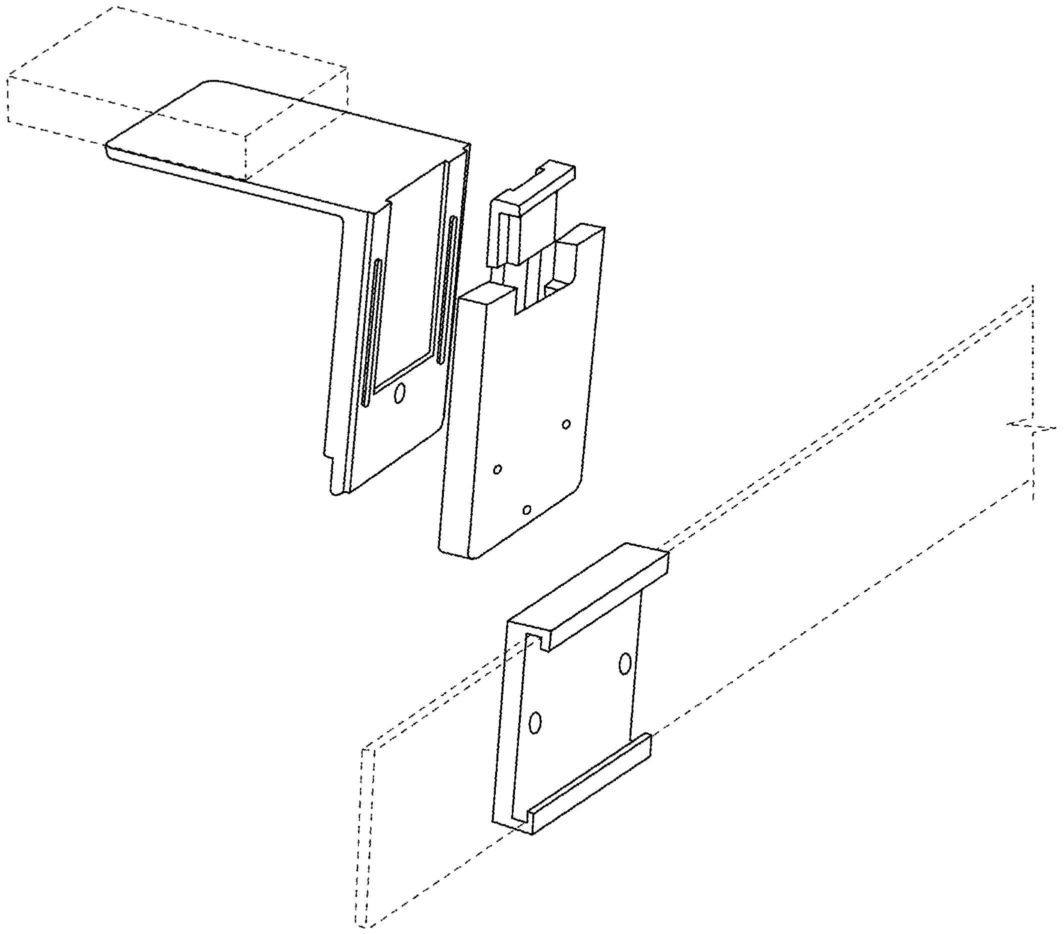

Having thus described embodiments of the invention in general terms, reference will now be made the accompanying drawings, wherein:

FIG. 1 provides a perspective view of one embodiment of a device for assisting with extension and/or flexion;

FIG. 2 provides a partial perspective view of one embodiment of a device for assisting with extension and/or flexion, in accordance with embodiments of the invention;

FIG. 3 provides a partial perspective view of one embodiment of a device for assisting with extension and/or flexion, in accordance with embodiments of the invention;

FIG. 4 provides a partial perspective view of one embodiment of a device for assisting with extension and/or flexion, in accordance with embodiments of the invention;

FIG. 5 provides a partial perspective view of one embodiment of a device for assisting with extension and/or flexion, in accordance with embodiments of the invention;

FIG. 6 provides a partial perspective view of one embodiment of a device for assisting with extension and/or flexion, in accordance with embodiments of the invention;

FIG. 7 provides a partial perspective view of one embodiment of a device for assisting with extension and/or flexion, in accordance with embodiments of the invention;

FIG. 8 provides a partial perspective view of one embodiment of a device for assisting with extension and/or flexion, in accordance with embodiments of the invention;

FIG. 9 provides a partial perspective view of one embodiment of a device for assisting with extension and/or flexion, in accordance with embodiments of the invention;

FIG. 10 provide a partial side elevation of one embodiment of a device for assisting with extension and/or flexion, in accordance with embodiment of the invention;

FIG. 11 provides a schematic of one embodiment of a device for assisting with extension and/or flexion, in accordance with embodiments of the invention;

FIG. 12 provides a partial side elevation of one embodiment of a device for assisting with extension and/or flexion, in accordance with embodiments of the invention;

FIG. 13 provides a partial side elevation of one embodiment of a device for assisting with extension and/or flexion, in accordance with embodiments of the invention;

FIG. 14A provides a partial perspective view of one embodiment of a device for assisting with extension and/or flexion, in accordance with embodiments of the invention;

FIG. 14B provides a partial perspective view of one embodiment of a device for assisting with extension and/or flexion, in accordance with embodiments of the invention;

FIG. 15A provides a partial side elevation of one embodiment of a device for assisting with extension and/or flexion, in accordance with embodiments of the invention;

FIG. 15B provides a partial side elevation of one embodiment of a device for assisting with extension and/or flexion, in accordance with embodiments of the invention;

FIG. 16 provides a partial perspective elevation of one embodiment of a device for assisting with extension and/or flexion, in accordance with embodiments of the invention;

FIG. 17 provides a partial perspective view of one embodiment of a device for assisting with extension and/or flexion, in accordance with embodiments of the invention;

FIG. 18 provides a perspective view of one embodiment of a device for assisting with extension and/or flexion, in accordance with embodiments of the invention;

FIG. 19 provides a perspective view of one embodiment of a device for assisting with extension and/or flexion, in accordance with embodiments of the invention;

FIG. 20 provides a partial perspective view of one embodiment of a device for assisting with extension and/or flexion, in accordance with embodiments of the invention;

FIG. 21 provides a partial perspective view of one embodiment of a device for assisting with extension and/or flexion, in accordance with embodiments of the invention; and FIG. 22 provides a partial perspective view of one embodiment of a device for assisting with extension and/or flexion, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Like numbers refer to like elements throughout.

Referring now to FIG. 1, a device for assisting in upper extremity support and range of motion 10 is illustrated according to one embodiment of the present invention. It should be noted that as used herein, the upper extremity support and range of motion device may be simply referred to as "the device" or "device for assisting with extension and/or flexion". As shown in FIG. 1, the device 10 includes a chair 12 for a user to sit in during therapeutic treatment, a power unit assembly 14, a mounting and support frame 16, an arm manipulation device 20, and an upright base 18. It should be noted that as used herein, the arm manipulation device 20 may be simply referred to as "the arm device".

Mounting and Support

As shown in the embodiment of FIGS. 1 and 2 the support frame 16 is connected to the chair 12 at a position generally below a seat of the chair 212. Two frame lateral supports 260 connect to two chair rails under the chair (not shown). These lateral supports 260 have downwardly facing slots 261 sized to fit over the chair rails. Other connections are envisioned such as, but not limited to, clamps, worm gears, welding, chemical joining, and bolts. On a backside of the chair 12, the lateral supports 260 extend beyond the envelope of the chair 12 where they are connected by a cross support 264 extending in a perpendicular direction from and between ends of the lateral supports 260. The rear extension of the lateral supports 260 each have a vertical support frame leg 266 extending to the ground. It should be noted that as used herein, the terms 'rear' and 'backside' of the chair 12 are interchangeable and refer to a position behind the user's back when seated in the chair 12. Accordingly, a 'front' or 'forward' position is the direction in which the user faces when seated in the chair 12 and the 'sides' of the chair 12 are left and right with respect to the user when seated in the chair 12.

A mounting cross member 262 is positioned between the front and rear of the chair 12 and extends from one side of the chair 12 to the other side of the chair 12. The mounting cross member 262 is connected to the lateral supports 260 and extends beyond the envelope of the chair 12 on both sides of the chair 12. The mounting cross member 262 is fastened to a top side of each lateral support 260. Fastening can be done by interlocking slots, tongue and groove, bolts, welding, chemical joining, clamps, and other suitable fastening methods.

All of the support frame 16 components are made of a rigid material capable of supporting other parts of the device 10. Examples of materials include, but are not limited to, steel, aluminum, iron, plastic, fiber reinforced carbon, other metals, or various alloys. Each component 260, 264, 266, 262 may be made of the same material or different materials. In FIG. 2 all of the frame components 260, 264, 266, 262 are shown as 't-slot' extrusions having one or more channels for ease of connection and adjustability. It is envisioned that other shapes such as round bars, tubular beams, or other suitable alternatives can be used.

The mounting cross member 262 extensions on each side of the chair 12 enable the power unit assembly 14 and the upright base 18 to be attached on either side of the chair 12 depending on which arm of the user is subject to therapeutic treatment. The upright base 18 has a mounting plate 19, seen in FIG. 5, which mounts onto one end of the mounting cross member 262. The mounting plate 19 connects to the cross member 262 with at least one fastener, such as a bolt which connects through holes 21 in the mounting plate 19. Similarly, the power unit assembly 14 mounts to the mounting cross member 262 on an opposite side of the chair 12 as the upright base 18. Both the upright base 18 and the power unit assembly 14 are able to be secured at a desired position lengthwise along the mounting cross member 262 to accommodate the user.

FIG. 3 shows an alternative embodiment where a bench seat 312 is used instead of a more traditional chair as is shown in FIGS. 1 and 2. The bench seat 312 has a back 316 and a seat 314 to accommodate the user. The seat 314 extends to the left and right of where a user would sit to enable cavities 318, 320 on either side of the bench 312. These cavities 318, 320 are designed to accommodate and support the arm device 20 on either side of the bench 312. A fastener such as a threaded knob may be used to tighten the upright base 18 into the desired cavity 318, 320. The benefits of this embodiment are twofold. First, the support frame 16 shown in FIGS. 1 and 2 is relatively complex and requires additional tools for assembly whereas the bench 312 embodiment is relatively simple with less assembly and tools required. Secondly, the bench 312 embodiment enables easy reconfiguration for flexion and/or extension on either arm of the user by simply detaching and reattaching the arm device 20 to either side of the bench 312.

In alternative embodiments of the device 10, the upright base 18 can be freestanding, mounted to a secondary structure, the floor, a table, a wall, the ceiling or other various furniture and/or equipment. Likewise, the power unit assembly 14 can be freestanding or mounted as mentioned previously. Additionally, the power unit assembly 14 can be positioned on the same side of the chair as the upright base 18, or in another position close to, or distant from the chair 12 such that a third party, for example a medical professional, is able to access and control the power unit assembly 14. Other embodiments of the device 10 are envisioned with a configuration enabling the elimination of the chair 12 allowing the user to stand. In this standing configuration, the power unit assembly 14 and the upright base 18 are positioned such that the user has ergonomic access for treatment while standing.

Power Unit

Referring now to FIG. 4, the power unit assembly 14 includes a power unit support structure 418, 420, 422, a small cylinder (a.k.a. "power cylinder") 414, a reservoir, plumbing, a pivoting pump lever 412, a hand grip 410, and an adjustment switch 416. The working cylinder 414 is positioned such that reciprocating pivoting of the lever 412 causes a pumping action to the power cylinder 414 such that the mechanical energy of the user operating the lever 412 is converted to hydraulic energy by the power cylinder 414. Such pumping causes fluid pressurized within the power cylinder 414 to transfer fluid pressure to a second, main cylinder (a.k.a. "working cylinder") 60, shown in FIG. 5, located on the arm device 20 causing extension or flexion of the user's arm.

An adjustment switch 416 is positioned on the power unit support structure 418, 420, 422. The switch 416 changes the direction of operation for the working cylinder 60 such that the user can select the desired therapeutic motion of flexion or extension. The position and operation of the working cylinder 60 is discussed elsewhere in this application.

In an alternative embodiment the power unit assembly 14 is configured such that a user can engage with the power cylinder 414 using a foot lever. This enables a user to utilize a foot instead of an opposite hand for controlling the power and working cylinders 414, 60.

In other alternative embodiments the power unit assembly 14 utilizes a different type of system to generate the required energy for moving the arm device. For example the power unit may be a mechanical device having a series of gears providing a mechanical advantage based on the gearing.

Arm Manipulation Device

The components of one embodiment of the arm device 20 are best shown in FIGS. 5-10. The arm device 20 is configured such that the user is able to place the arm to be treated in the arm device 20 and through hydraulics is able to either perform flexion or extension therapeutic treatment on the arm. Arm positioning for flexion is shown in FIG. 6 while arm positioning for extension is shown in FIG. 7. The working cylinder 60 provides the required force for flexion and extension depending on the switch 416 setting.

The arm device comprises an upper arm structural member 30, a forearm structural member 40, and a pivot connection 50 operatively coupled to the structural members 30, 40. The arm device 20 is connected to the upright base 18 by way of a mounting plate 17 which is attached to the upper arm structural member 30.

The working cylinder 60 has a force application mechanism 62 and a force applicator 64 connected to the structural members 30, 40 respectively to move the forearm structural member 40 with respect to the upper arm structural member 30. The pivot connection 50 directs rotational motion for the structural members 30, 40 such that a user's arm is able to experience a full range of motion, for example from 0 degrees to 140 degrees of flexion, about the elbow. FIG. 10 shows the rotational movements as the force applicator 64 moves. Examples of pivot connections 50 include, but are not limited to, rotating shafts, cylindrical joints, hinges, mechanical linkages, ball joints, gear/cog rotation, and other types of mechanical joints. The structural members 30, 40 may be formed of various materials, including but not limited to, steel, rigid plastic, wood, metals, composites, or other suitable materials or combinations thereof such as any other material that provides the necessary structure. Additionally, the structural members 30, 40 can be formed of a single material or of more than one same or different material.

As seen in one embodiment shown in FIGS. 18-21, the structural members 30, 40 are two connected offset relatively flat elongate members which form a middle open space. Each structural member 30, 40 has a user facing flat elongate member 32, 42 and an outwardly facing elongate member 34, 44. The upper arm elongate members 32, 34 are relatively similar in length and width. The forearm elongate members 42, 44 differ in at least length as the outward facing forearm elongate member 44 is shorter in length compared to the user facing forearm elongate member 42. Other embodiments are envisioned where the elongate members 32, 34, 42, 44 are alternative variations in length and width. As used in this application "user facing" and "outward facing" are used to denote the general orientation with respect to the user when seated in the chair 12.

In another embodiment shown in FIGS. 18-21, the structural members 30, 40 each only have one elongate member rather than the previously discussed user facing/outward facing elongate members. As shown in FIGS. 18 and 19, the upper arm structural member and the lower arm structural member are each a single flat elongate member where the force application mechanism and the force applicator are attached to one side of the respective structural members, and the shoulder, elbow, and wrist pads are attached to the other side of the respective structural members. In this embodiment it is preferable for the arm device to be mounted on the top of the upright base to swap between left and right orientations. A dovetail mounting plate may be attached to the upper arm structural member in order to attach the arm device to the upright base in this alternative embodiment.

Both the upper arm and forearm structural members 30, 40 have a pivot end and a distal end. The pivot ends are generally located proximate to the pivot connection 50. The force application mechanism 62 is connected to both the force applicator 64 and the outward facing upper arm elongate member 34 of the upper arm structural member 30 at a position proximate to the distal end of the upper arm structural member 30. Similarly, the force applicator 64 is connected to both the force application mechanism 62 and the outward facing forearm elongate member 44 of the forearm structural member 40 at a position proximate to the distal end of the forearm structural member 40. In one embodiment the working cylinder 60 is positioned on an outward side of the arm device 20 and in another embodiment the working cylinder 60 is positioned within the middle open space between the elongate members 32, 34 and 42, 44. In another embodiment, the upper arm structural member 30 and/or the lower arm structural member 40 are one piece and do not have separate user facing and outward facing pieces.

The upper arm structural member 30 includes two arm engaging supports, a shoulder support 70 and an elbow support 80. The shoulder and elbow supports 70, 80 are positioned on the user facing upper arm elongate member 32. During usage, the user will position the arm to be manipulated such that the users elbow axis of rotation is aligned with the axis rotation for the pivoting connection 50. The user's arm rests against the elbow support 80 generally at a posterior position of the upper arm near the elbow. The user's shoulder rests against the shoulder support 70 generally at an anterior position of the upper arm near the shoulder. Note that the shoulder support 70 may optionally be removable to enable full range of motion during extension treatment.

The elbow and shoulder supports 70, 80 each have a structural portion 72, 82 which connects to the respective structural member 30, 40 and a padded portion 74, 84 which directly engages the user's arm and provides comfort to the user. The structural portions 72, 82 form an L shape with a base 71, 81 which directly connects to the user facing elongate member 32 and a flange 73, 83 extending toward the user to which the padded portions 74, 84 are connected.

A wrist support 90 is positioned on the user facing forearm elongate member 42. The wrist support 90 has a structural base 92 which is adapted to connect to the user facing elongate member 42 of the forearm structural member 40. A wrist padded portion 94 extends outwardly from the base and is adapted for a user to rest their wrist against either side of the wrist padded portion 94 depending on the desired therapeutic movement of flexion or extension. During flexion treatment, a posterior side of the user's wrist rests at or near one side of the padded portion 94, and during extension treatment, an anterior side of the user's wrist rests at or near the other side of the padded portion 94.

The padded portions 74, 84, 94 can be made from rubber, foam, cloth, or other suitable materials. Different padded portions 74, 84, 94 can be made of different materials or even different combinations of materials. For example cloth covered rubber or foam.

Exact positioning of the limb can be based upon input from a medical/rehabilitation expert, upon manufacturer instructions or ergonomics. Various aspects of the arm device 20 and entire device 10 are adjustable as discussed elsewhere in this application.

In addition to the other features and functionality, it is also envisioned that the arm device 20 can be modified to add pronation/supination capabilities. These capabilities may be added onto the lower arm structural member 40 as a supplement to the wrist pad 90, or be a replacement for the wrist support 90. The pronation/supination motion may be independent of the flexion/extension motion. This can be achieved by using a separate force application mechanism, for example a separate cylinder. Alternatively the pronation/supination motion may be used in conjunction with the flexion/extension motion. For example, when the elbow flexes, the wrist rotation is directly correlated to the flexion motion.

Working Cylinder

As best seen in FIG. 9 and described elsewhere, the working cylinder 60 is positioned on the outward facing elongate members 34, 44. Fluid pressure generated when the user pulls or pushes the pivot pump lever 412 is transferred from the power cylinder 414 to the working cylinder 60. This causes a piston (not shown) inside of the force application mechanism's barrel (not shown) to move the force applicator 64 by a predetermined amount each time the user pulls or pushes the pivot pump lever 412.

Based on the switch 416 setting, the working cylinder 60 either retracts the force applicator 64 with each pump of the pivot pump lever 412 for flexion treatment or extends the force applicator 64 with each pump of the pivot pump lever 412 for extension treatment. The user is able to control the degree of rotation for flexion or extension based on the distance the pivot pump lever 412 is moved with each pump. When retracting for flexion, the forearm structural member 40 is rotated about the pivot connection 50 towards the upper arm structural member 30. When extending for extension the opposite occurs and the forearm structural member 40 is rotated away from the upper arm structural member 30.

FIG. 11 shows a schematic-type drawing of plumbing required to achieve the transfer of fluid pressure. The schematic shows one of several options available. This one includes a valve arrangement which facilitates the use of an "extend" as well as a "retract" position for the switch 416, in which the user can manipulate the switch to the "extend" position such that pumping of the pump cylinder ("e.g. power cylinder 414) causes extension of the main cylinder (e.g. working cylinder 60), and whereas the user can manipulate the switch to the "retract" position such that pumping of the power cylinder 414 causes a retraction of the working cylinder 60. An alternative version includes the use of springs or other suitable devices for a return feature, with pumping only being used to provide cylinder extension and the springs/etc used to provide flexion, or vice versa.

Arm Support Adjustability

Adjustability is an important aspect of the arm device 20 as users have different arm and body dimensions. The various adjustability features for adapting to users of various shapes and sizes are best shown in FIGS. 12-13. Movement arrows on these figures denote the possible movements in one embodiment.

FIG. 12 shows the user facing upper arm elongate member 32. One or more of the arm supports 70, 80 are adapted to move lengthwise along the user facing upper arm elongate member 32. Adjustment of these arm supports 70, 80 enables users of different upper arm lengths to use the arm device 20. The lengthwise movement is accomplished by a series of spaced-apart holes 36 along the user facing elongate members 32, 42 and coordinating pegs (not shown) positioned on the base of the arm support structural portions 71, 81. Other methods for lengthwise movement can be achieved by threaded knobs with slots, magnets, slide screws, clamps, and other suitable methods which accomplish the desired movement.

In addition to lengthwise movements, the shoulder and elbow padded portions 74, 84 are adapted to move in a direction perpendicular to the previously described lengthwise movement. This perpendicular movement enables the arm device 20 to be adjusted for users having varying arm sizes. At least one threaded bolt 76, 86 is connected to the padded portions 74, 84 and passes through the flanges 73, 76. A threaded nut 78, 88 is used to secure the padded portions 74, 84 at a desired location. Other methods of moving the padded portions 74, 84 are also envisioned such as, gears, cam and follower, as well as other movable fasteners. In other embodiments, the arm supports 70, 80 may be adapted to rotate.

FIG. 13 shows the user facing forearm elongate member 42. The wrist support 90 is adapted to move in a lengthwise direction along the user facing forearm elongate member 42 in a similar manner as described above using a plurality of spaced-apart holes 46 for the elbow and shoulder supports 70, 80. The wrist support base 92 can be movably connected identically to the elbow and shoulder supports 70, 80 or in another method previously described.

In order to enable the user to alternate between flexion and extension, the wrist support padded portion 94 has two sides upon which the user's wrist can rest and is able to rotate clockwise and counter clockwise for optimal wrist positioning. Again, refer to FIGS. 6 and 7 for the two alternative wrist placement configurations for flexion and extension treatments. One embodiment enables the wrist support 90 to rotate +/−20 degrees. The user can position their forearm in any orientation relative to the wrist support 90 to stretch the elbow in the appropriate plane (i.e. the palm can be positioned facing up or positioned facing towards the torso).

In FIGS. 14A and 14B, an alternative embodiment of the arm support 500 is shown. The arm support 500 shown can function for shoulder, elbow, or both as described above. In this embodiment, the arm support 500 has an "L-shaped" bracket 502 with a pad 504 on the inside surface of one leg of the "L". The outside of the opposing leg of the "L" has ridges 510 which slidably connect to respective channels 512 on a mounting piece 506. The mounting piece 506 is attached to the upper arm structural member 30. The bracket 502 is able to slide when a button 508 protruding from the mounting piece 506 is pushed inwards. To slide the bracket 502, mechanisms such as one-way locking ratchet mechanism or double locking rollers may be used. Other types of movable fasteners are also envisioned. Additionally a swivel function can be added to enable a rotational adjustment for the bracket 502 using a detent.

FIG. 22 shows an exploded view of an alternative embodiment of the arm supports. The release button is pressed to allow the angled bracket to slide into position. The ratchet mechanism allows for a semi-free indexed movement in only one direction whereas the roller mechanism locks in both directions and allows for continuous/infinite (as opposed to indexed or incremental) adjustments.

Arm Device Adjustability

As best seen in FIGS. 15A and 15B, the arm device 20 is able to be adjusted for different users. First, the entire arm device 20 is able to move up and down along the upright base 18 in order to adjust to the user's height. At least one threaded knob 130 secures the arm device mounting plate 17 to the upright base 18. Loosening the one or more threaded knobs 130 enables the arm device mounting plate 17, and therefore the arm device 20, to be moved to a desired location. Once the desired location is reached, the one or more threaded knobs 130 are tightened in order to secure the arm device 20 in place.

Alternatively, the upright base 18 can be telescoping as shown in FIG. 16. In this alternative embodiment, the height of the arm device 20 would instead be adjusted by changing the height of the telescoping upright base 18 itself. In one telescoping embodiment it is envisioned that the telescoping base 18 would have a top upward telescoping portion adapted for connection to the arm device 20. The upright base 18 may be devoid of any channels.

Secondly, the arm device 20 is able to adjust lengthwise along a centerline of the upper arm structural member 30. This is accomplished by a slot 132 which runs lengthwise along a portion of the outward facing upper arm elongate member 34. A threaded knob 132 passes through the slot 134 and enables the arm device 20 to move in the lengthwise direction along the path of the slot 134 when the threaded knob 132 is loosened. Once a desired position is reached, the threaded knob 134 is tightened to secure the arm device 20. Other lengthwise movements such as peg and holes, magnets, brackets, slide screws, and the like are also envisioned.

FIG. 17 shows an alternative embodiment where the upright base 18 is able to rotate. To achieve this rotation; the upright base 18 is attached to a swivel plate 619. The swivel plate 619 has two curved slots 622 that each have a threaded knob 624. The threaded knobs 624 can be loosened to rotate the swivel plate 619 and tightened to secure the swivel plate 619 in a desired position. This embodiment is compatible with the chair 12 configuration of FIGS. 1 and 2, and the bench 312 configuration of FIG. 3. In the chair 12 configuration, the bottom of the swivel plate 619 connects to the cross member 262. In the bench 312 configuration, an extension below the swivel plate 619 compatible with the cavities 318 in the bench seat 314. The slots 622 could also be a series of adjustment holes where a user would remove threaded knobs 624, rotate the device and then retighten the plate 619.

It is envisioned that the bench configuration would have foldable legs and a removable seat back to enable compact storage of the bench. The ability to combine the bench (or other type of seat) with the arm device and upright base in a single package is valuable in order to limit the number of shipments and packages required as well as improve storage ability.

Left Arm and Right Arm Reconfiguration

As previously discussed, the device 10 is reconfigurable such that the upright base 18 and the power unit assembly 14 are able to be secured to either side of the user for use on the user's left or right arm. When the arm device 20 is moved from one side to the other, the forearm structural member 40 must be adjusted approximately 180 degrees. Disassembly of certain parts is generally necessary for this adjustment. Threaded knobs 138 and 136 shown in FIGS. 15A and 15B secure the forearm structural member 40 in place and can be loosened or removed to rotate the entire forearm structural member 40 about the pivot connection 50. The connection between the force applicator 64 and the outward facing forearm elongate member 44 should be moved to either the 140A or 140B position depending which side of the user the arm device 20 is located. A dovetail on the user facing elongate member 32 may also enable the reconfiguration of the arm device 20. FIG. 15A shows the resulting configuration for use of the arm device 20 on the user's left arm and FIG. 15B shows the right arm configuration.

Additionally, one or both of the elbow and shoulder supports 80, 70 are capable of being flipped by 180 degrees. In one embodiment this is achieved by detents that allow the pads to swivel when the detents are released.

In order to setup and adjust the device for assisting with extension and/or flexion 10, either the user or a third party must complete certain steps. The steps below provide a general set of instructions and it should be noted that the steps can be modified, eliminated, and/or new steps added in order to accommodate the different embodiments of the device described herein.

Alternative Arm Length and Arm Height Adjustments

Referring to FIGS. 20 and 21, an alternative embodiment of the upright base and arm device is shown. Shoulder height adjustment is performed by raising an inner telescoping tube 1 out of an outer telescoping tube and locked with a lower threaded knob 2. The uppermost part of the inner telescoping tube 1 is angled and includes a dovetailed slot to accommodate a lower rail 3 on the arm device. Arm length adjustments are made by sliding the lower rail 3 along a slot and then locking position with a threaded knob 5. This action pushes an inner block 4 into the rail 3. The center rail, shown in gray on FIGS. 20 and 21, serves to help guide the arm unit by sliding against the uppermost angled surface of inner telescoping tube 1 and does not lock.

The inner telescoping tube 1 is slotted on both sides to allow the device to be reconfigured for use on left and right arms. Reconfiguration is performed by sliding the arm device off of the inner telescoping tube 1 and flipping the arm device accordingly.

Setup Instructions

1) Attach mounting and support frame 16 to the folding chair.

2.) Attach power unit assembly 14 and arm device 20 to opposite sides of the chair.

For right arm use, position arm device 20 on right side of chair.

For left arm use, position arm device 20 on left side of chair.

3.) Adjust arm device 20 and power unit assembly 14 for the specific user.

Adjustment Instructions

1.) For power unit assembly 14, adjust position for optimal and ergonomic use by the arm not being treated.

Adjust power unit support structure member 422 position lengthwise on mounting member 262 based on the size of the user.

Adjust power unit support structure member 420 perpendicular distance from mounting member 262 based on the size of the user.

2.) For arm device 20, adjust position for optimal and ergonomic use by the arm being treated.

Adjust arm device 20 height along upright base 18 based on size of the user.

Adjust arm device 20 lengthwise along the centerline of the upper arm structural member based on size of the user.

3.) For shoulder and elbow supports 70, 80, adjust positioned for optimal and ergonomic use by the arm being treated.

Position user's arm to be treated such that the elbow aligns with the pivot connection 50.

Adjust elbow support 80 for support and contact of the upper arm on a posterior side proximate to the elbow.

Adjust shoulder support 70 for support and contact of the upper arm on an anterior side proximate to the shoulder. Remove shoulder support 70, if desired, for extension treatment.

4.) For wrist support 90, position wrist with respect to the wrist support 90 based on the desired flexion or extension treatment.

Position anterior side wrist for contact with wrist support 90 for flexion treatment.

Position posterior side of wrist for contact with wrist support 90 for extension treatment.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A device for manipulating an arm of a user, thereby providing extension or flexion assistance to the arm about an elbow, the device comprising:

(a) an arm engagement system comprising:

i. an upper arm member comprising an upper arm frame having a pivot end and a distal end, and a posterior elbow pad configured to engage a back of the user's elbow, the upper arm member further including an anterior upper arm pad configured to engage an upper arm of the user, the anterior upper arm pad being adapted to rotate 180 degrees around an axis perpendicular to the upper arm member for use on an opposite arm of the user;

ii. a forearm member comprising a forearm frame having a pivot end and a distal end and a distal wrist pad configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (b) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow.

2. The device according to claim 1, wherein the force application mechanism is a hydraulic cylinder.

3. The device according to claim 2, wherein the hydraulic cylinder is powered by a hand pump adapted for use with an arm of the user not being manipulated.

4. The device according to claim 1, wherein the force application mechanism is a gear based mechanical system.

5. The device according to claim 1, wherein the arm engagement system is mounted on an upright member configured to be positioned on a side of the user.

6. The device according to claim 5, wherein the arm engagement system is adapted to move in a vertical direction along a length of the upright member for adapting to users of different heights.

7. The device according to claim 6, wherein the upper arm member is connected to the upright member at a position proximate to the pivot end of the upper arm frame.

8. The device according to claim 1, wherein the anterior upper arm pad is adapted to adjust in a direction perpendicular to the upper arm member for adapting to users of different arm sizes.

9. The device according to claim 1, wherein the anterior upper arm pad is adapted to adjust in a direction along a length of the upper arm member for adapting to users of different arm sizes.

10. The device according to claim 1, wherein the anterior upper arm pad is adapted to rotate around the axis perpendicular to the upper arm member for adapting to users of different arm sizes.

11. The device according to claim 1, wherein the posterior elbow pad is adapted to adjust in a direction perpendicular to the upper arm member for adapting to users of different arm sizes.

12. The device according to claim 1, wherein the posterior elbow pad is adapted to adjust in a direction along a length of the upper arm member for adapting to users of different arm sizes.

13. The device according to claim 1, wherein the posterior elbow pad is adapted to rotate around an axis perpendicular to the upper arm member for adapting to users of different arm sizes.

14. The device according to claim 1, wherein the posterior elbow pad is adapted to rotate 180 degrees around an axis perpendicular to the upper arm member for use on an opposite arm of the user.

15. The device according to claim 1, wherein the distal wrist pad is adapted to engage an anterior side of the wrist when the elbow is in flexion and the posterior side of the wrist when the elbow is in extension.

16. The device according to claim 1, wherein the distal wrist pad is adapted to adjust in a direction along a length of the forearm member for adapting to users of different arm sizes.

17. The device according to claim 1, wherein the distal wrist pad is adapted to rotate around an axis perpendicular to the forearm member for adapting to users of different arm sizes.

18. The device according to claim 1, wherein the posterior elbow pad, and the distal wrist pad, include a cushion for user comfort.

19. The device according to claim 1, wherein the anterior upper arm pad includes a cushion for user comfort.

20. The device according to claim 1, wherein the anterior upper arm pad is adapted to adjust in a direction perpendicular to the upper arm of the user for adapting to users of different arm sizes.

21. The device according to claim 1, wherein the anterior upper arm pad is adapted to adjust in a direction along a length of the upper arm of the user for adapting to users of different arm sizes.

22. The device according to claim 1, wherein the anterior upper arm pad is adapted to rotate around an axis perpendicular to the upper arm of the user for adapting to users of different arm sizes.

23. The device according to claim 1, wherein the posterior elbow pad is adapted to adjust in a direction perpendicular to the upper arm of the user for adapting to users of different arm sizes.

24. The device according to claim 1, wherein the posterior elbow pad is adapted to adjust in a direction along a length of the upper arm of the user for adapting to users of different arm sizes.

25. The device according to claim 1, wherein the posterior elbow pad is adapted to rotate around an axis perpendicular to the upper arm of the user for adapting to users of different arm sizes.

26. The device according to claim 1, wherein the distal wrist pad is adapted to adjust in a direction along a length of a forearm of the user for adapting to users of different arm sizes.

27. The device according to claim 1, wherein the distal wrist pad is adapted to rotate around an axis perpendicular to a forearm of the user for adapting to users of different arm sizes.

28. The device according to claim 1, wherein the anterior upper arm pad is adapted to:

(a) adjust in a direction perpendicular to the upper arm of the user for adapting to users of different arm sizes;

(b) adjust in a direction along a length of the upper arm of the user for adapting to users of different arm sizes; and (c) rotate around an axis perpendicular to the upper arm of the user for adapting to users of different arm sizes.

29. The device according to claim 1, wherein the posterior elbow pad is adapted to:

(a) adjust in a direction perpendicular to the upper arm of the user for adapting to users of different arm sizes;

(b) adjust in a direction along a length of the upper arm of the user for adapting to users of different arm sizes; and (c) rotate around an axis perpendicular to the upper arm of the user for adapting to users of different arm sizes.

30. A device for manipulating an arm of a user, thereby providing extension or flexion assistance to the arm about an elbow, the device comprising:

(a) an arm engagement system comprising:

i. an upper arm member comprising an upper arm frame having a pivot end and a distal end, and a posterior elbow pad configured to engage a back of the user's elbow, the upper arm member further including an anterior upper arm pad configured to engage an upper arm of the user, the anterior upper arm pad being adapted to rotate 180 degrees around an axis perpendicular to the upper arm of the user for use on an opposite arm of the user;

ii. a forearm member comprising a forearm frame having a pivot end and a distal end and a distal wrist pad configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (b) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow.

31. A device for manipulating an arm of a user, thereby providing extension or flexion assistance to the arm about an elbow, the device comprising:

(a) an arm engagement system comprising:

i. an upper arm member comprising an upper arm frame having a pivot end and a distal end, and a posterior elbow pad configured to engage a back of the user's elbow, wherein the posterior elbow pad is adapted to rotate 180 degrees around an axis perpendicular to an upper arm of the user for use on an opposite arm of the user;

ii. a forearm member comprising a forearm frame having a pivot end and a distal end and a distal wrist pad configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (b) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow.

32. A device for manipulating an arm of a user, thereby providing extension or flexion assistance to the arm about an elbow, the device comprising:

(a) an arm engagement system comprising:

i. an upper arm member comprising an upper arm frame having a pivot end and a distal end, and a posterior elbow pad configured to engage a back of the user's elbow, further including an anterior upper arm pad configured to engage an upper arm of the user, each of the anterior upper arm pad and the posterior elbow pad being adapted to rotate 180 degrees around an axis perpendicular to the upper arm of the user for use on an opposite arm of the user;

ii. a forearm member comprising a forearm frame having a pivot end and a distal end and a distal wrist pad configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (b) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow.

33. A device for manipulating an arm of a user, thereby providing extension or flexion assistance to the arm about an elbow, the device comprising:

(a) an arm engagement system comprising:

i. an upper arm member comprising an upper arm frame having a pivot end and a distal end, and a posterior elbow pad cantilevered outward in a perpendicular direction from the upper arm frame and configured to engage a back of the user's elbow, the upper arm member further including an anterior upper arm pad configured to engage an upper arm of the user, the anterior upper arm pad being adapted to rotate 180 degrees around an axis perpendicular to the upper arm of the user for use on an opposite arm of the user;

ii. a forearm member comprising a forearm frame having a pivot end and a distal end and a distal wrist pad configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (b) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow.

34. A device for manipulating an arm of a user, thereby providing extension or flexion assistance to the arm about an elbow, the device comprising:

(a) an arm engagement system comprising:

i. an upper arm member comprising an upper arm frame having a pivot end and a distal end, a posterior elbow pad cantilevered outward in a perpendicular direction from the upper arm frame and positioned proximate to the pivot end of the upper arm frame and configured to engage a back of the user's elbow, wherein the posterior elbow pad is adapted to rotate 180 degrees around an axis perpendicular to an upper arm of the user for use on an opposite arm of the user;

ii. a forearm member comprising a forearm frame having a pivot end and a distal end and a distal wrist pad cantilevered outward in a perpendicular direction from the forearm frame and positioned proximate to the distal end of the forearm frame and configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (b) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow.

35. A device for manipulating an arm of a user, thereby providing extension or flexion assistance to the arm about an elbow, the device comprising:

(a) a frame having spaced apart first and second mounting locations;

(b) an arm engagement system configured to be mounted to 1) the first mounting location or 2) the second mounting location, the arm engagement system comprising:

i. an upper arm member comprising an upper arm frame having a pivot end and a distal end, and a posterior elbow pad configured to engage a back of the user's elbow, wherein the posterior elbow pad is adapted to rotate 180 degrees around an axis perpendicular to an upper arm of the user for use on an opposite arm of the user;

ii. a forearm member comprising a forearm frame having a pivot end and a distal end and a distal wrist pad configured to engage a wrist of the user; and iii. a pivoting connection operatively coupled with the pivot end of the upper arm frame and the pivot end of the forearm frame, wherein the upper arm member and the forearm member are configured to pivot about the pivoting connection on an axis defined by the elbow as the arm of the user extends or flexes about the elbow; and (c) a force application system comprising:

i. a force applicator connected between the distal end and the pivot end of the forearm frame; and ii. a force application mechanism connected at or near the distal end of the upper arm frame, wherein the force application mechanism is configured to apply a force to the force applicator, thereby providing the extension or flexion assistance to the arm about the elbow; and (d) a power unit configured to be mounted to 1) the second mounting location if the arm engagement system is mounted to the first mounting location or 2) the first mounting location if the arm engagement system is mounted to the second mounting location, and adapted to provide power to the force application mechanism.

36. The device according to claim 35 wherein the power unit includes:

(a) a lever;

(b) a hand grip positioned on an end of the lever; and (c) whereby when the hand grip is moved by the user, the lever rotates to generate power.

37. The device according to claim 36 wherein the lever is connected to a power hydraulic cylinder.

38. A method for manipulating body parts of a user, thereby providing extension or flexion assistance to the arm of the user about an elbow joint of the user, the method comprising:

(a) engaging an upper arm of the user with an upper arm member of an arm engagement system, the upper arm member including an anterior upper arm pad configured to engage the upper arm of the user, the anterior upper arm pad being adapted to rotate 180 degrees around an axis perpendicular to the upper arm member for use on an opposite arm of the user;

(b) engaging a forearm of the user with a forearm member of the arm engagement system, wherein the forearm member is operatively coupled to the upper arm member at a pivoting connection, and wherein the upper arm member and the forearm member are configured to pivot about the pivoting connection on an axis defined by the elbow joint of the user; and (c) activating a force application mechanism to apply an incremental force to a first end of a force applicator, wherein a second end of the force applicator is operatively coupled to the body part engagement system, and wherein the applied incremental force causes a length between the first end of the force applicator and the second end of the force applicator to shorten, thereby causing extension or flexion of the arm engagement system and the arm of the user.

39. The method of claim 38, wherein the step of activating the force application mechanism further comprises the step of the user moving a lever on a power unit which provides power to the force application mechanism.

* * * * *